US012061784B2

(12) United States Patent
Malhotra et al.

(10) Patent No.: US 12,061,784 B2
(45) Date of Patent: Aug. 13, 2024

(54) GENERATING AGGREGATE DATA GEOSPATIAL GRID CELLS FOR ENCODING IN VECTOR TILES

(71) Applicant: ORACLE INTERNATIONAL CORPORATION, Redwood Shores, CA (US)

(72) Inventors: Smridh Malhotra, Nashua, NH (US); Liujian Qian, Newton, MA (US)

(73) Assignee: Oracle International Corporation, Redwood Shores (CA)

( * ) Notice: Subject to any disclaimer, the term of this patent is extended or adjusted under 35 U.S.C. 154(b) by 13 days.

(21) Appl. No.: 17/691,594

(22) Filed: Mar. 10, 2022

(65) Prior Publication Data
US 2023/0289045 A1     Sep. 14, 2023

(51) Int. Cl.
*G06F 3/04842* (2022.01)
*G06F 16/29* (2019.01)
*G06T 11/00* (2006.01)

(52) U.S. Cl.
CPC .......... *G06F 3/04842* (2013.01); *G06F 16/29* (2019.01); *G06T 11/00* (2013.01); *G06F 2203/04806* (2013.01); *G06T 2210/56* (2013.01)

(58) Field of Classification Search
CPC ................. G06F 3/048; G06F 3/04842; G06F 2203/04806; G06F 16/29; G06T 2210/56; G06T 3/4038
See application file for complete search history.

(56) References Cited

U.S. PATENT DOCUMENTS

2005/0035964 A1\*  2/2005  Heenan ................... G06T 17/20
                                                                   345/420
2007/0229524 A1\* 10/2007  Hendrey .............. G09B 29/106
                                                                   345/552
(Continued)

FOREIGN PATENT DOCUMENTS

CN           114064831 A  \*  2/2022

OTHER PUBLICATIONS

Geoserver. "Vector Files Tutorial". GitHub. Jun. 20, 2019. <https://github.com/geoserver/geoserver/blob/8d00aa6adc0e36b753e1dd3e7d7a8e02caefb86c/doc/en/user/source/extensions/vectortiles/tutorial.rst> (Year: 2019).\*

(Continued)

*Primary Examiner* — Liang Y Li
(74) *Attorney, Agent, or Firm* — Kraguljac Law Group, LLC

(57) ABSTRACT

Systems, methods, and other embodiments associated with generating aggregate data geospatial grid cells for encoding in vector tiles are described. In one embodiment, a method includes identifying a subset of finest-resolution geospatial grid cells contained by a vector tile in a set of finest-resolution geospatial grid cells and their associated aggregate data values; selecting a cell resolution level based on a zoom level of the vector tile; generating a new geospatial grid cell at the cell resolution level based on cell IDs of the subset of finest-resolution cells; generating a total aggregate data value for the new cell based on associated aggregate data values of the subset of finest-resolution cells; encoding the new cell and total aggregate data value in the vector tile; and transmitting the encoded vector tile to a client to cause the vector tile and the new cell to be displayed.

20 Claims, 9 Drawing Sheets

(56) References Cited

U.S. PATENT DOCUMENTS

| | | | | |
|---|---|---|---|---|
| 2012/0038662 | A1* | 2/2012 | Dicklin | G06F 16/29 |
| | | | | 345/635 |
| 2012/0206494 | A1* | 8/2012 | Sahr | G06F 16/29 |
| | | | | 345/660 |
| 2016/0080438 | A1* | 3/2016 | Liang | G06F 3/04812 |
| | | | | 715/753 |
| 2017/0293635 | A1* | 10/2017 | Peterson | G06F 16/2477 |
| 2019/0005696 | A1* | 1/2019 | Mccloskey | G06T 11/60 |
| 2022/0156291 | A1* | 5/2022 | Brodsky | G06F 16/248 |

OTHER PUBLICATIONS

Informix. "CLOB data structure". ibm. Mar. 3, 2021. <https://www.ibm.com/docs/en/informix-servers/12.10?topic=SSGU8G_12.1.0/com.ibm.ddi.doc/ids_ddi_298.html> (Year: 2021).*

Thakker, Anand. "vt-grid: Buildup a pyramid of mapbox vector tiles by aggregating quantitative data into grids at lower zooms" Jul. 12, 2016. <https://github.com/developmentseed/vt-grid> (Year: 2016).*

Duo XU;—Duo Space, Welcome to my space!; Uber H3 Index; May 23, 2020; pp. 1-5.

H3GEO;—H3 Hexagonal Hierarchical Geospatial Indexing System; downloaded on Oct. 11, 2021 from: https://h3geo.org/ and https://h3geo.org/docs/ and https://h3geo.org/docs/highlights/aggregation/; pp. 1-5.

H3GEO; Indexing_H3; downloaded on Feb. 10, 2022 from https://h3geo.org/docs/highlights/indexing/ pp. 1-3.

Sahr et al.; Geodesic Discrete Global Grid Systems; pp. 121-134; Cartography and Geographic Information Science, vol. 30, No. 2, 2003.

Isaac Brodsky; H3: Uber's Hexagonal Hierarchical Spatial Index; Jun. 27, 2018; pp. 1-11; downloaded from: https://eng.uber.com/h3/.

* cited by examiner

GENERATING AGGREGATE DATA GEOSPATIAL GRID CELLS FOR ENCODING IN VECTOR TILES

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Grid systems for geospatial indexing (such as H3) may provide well-defined cells to aggregate data points over irregular geographic areas. In geospatial indexing grid systems, the grid may include coarser and finer resolution levels. The number of cells increase exponentially with each resolution level, causing a severe computing resource challenge for indexing and querying databases representing datapoints in the grid cells. This resource challenge can prevent the use of visualizations of grid-indexed data in a vector map environment.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1A:
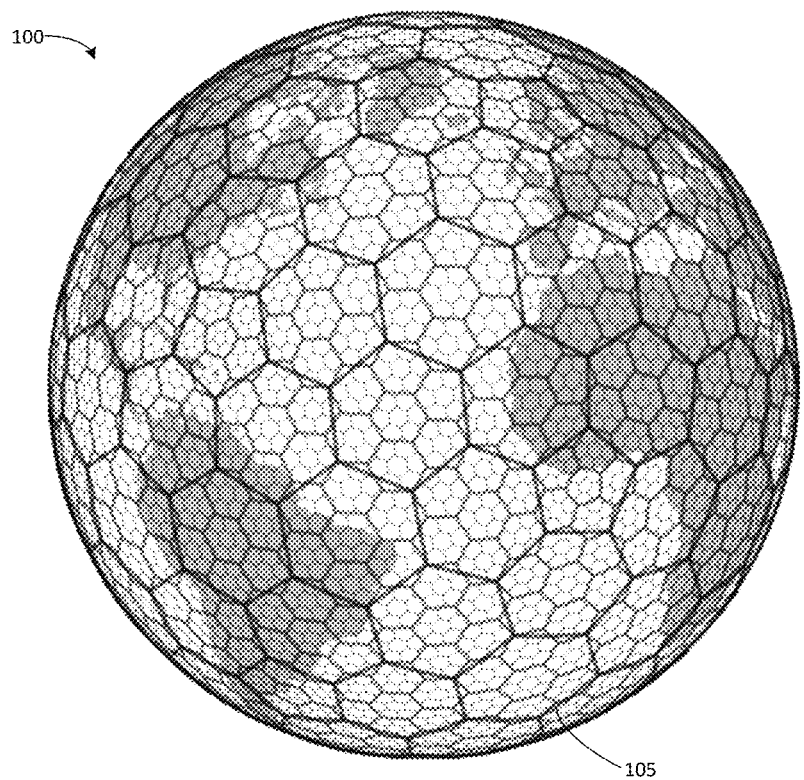
FIG. 1A illustrates a globe 100 partitioned by a hexagonal grid 105 in accordance with the H3 geospatial indexing system.

Systems, methods, and other embodiments are described herein that provide a novel database-centric approach to aggregating and visualizing large volume data points using grid cells such as hexagons. In one embodiment, systems, methods, and other embodiments are described herein for generating aggregate data geospatial grid cells for encoding in vector tiles. The systems, methods, and other embodiments as shown and described herein provide full resolution scale automated cell aggregation while reducing both CPU time and memory usage. The systems, methods, and other embodiments as shown and described herein enable real-time generation of grid cells and associated aggregate data at resolution scales relevant for practical visualization in a thematic map composed of vector tiles. In one embodiment, these and other advantages are achieved by reducing the amount of cell data to be persisted and executing a delayed/lazy resolution layer construction, as shown and described herein. In one embodiment, further improvement to performance is achieved by optimizing vector tile generation for cells (such as H3 hexagons) using a novel approach that allows dynamically build and aggregate independent small blocks of cells (such as hexagons) pertaining to a resolution level, to be served to the client. The improvements in CPU time and memory usage when executing data geospatial grid cell generation and data aggregation for encoding in vector tiles over prior art are apparent when both are executed using a benchmark computing system. The systems, methods, and other embodiments described herein for therefore present an improved approach for geospatially-indexed data visualization for maps (such as thematic maps that portray a geographic pattern of a particular subject matter, for example, the geospatially-indexed data). The systems, methods, and other embodiments presented herein offer a database-centric approach to aggregating and visualizing large volume data points using grid cells In one embodiment, the systems, methods, and other embodiments disclosed herein leverage features of hexagonal grid systems, such as H3. Accordingly, examples of the systems, methods, and other embodiments are described herein with reference to hexagon grid cells and hexagonal geospatial indexing systems, but in some embodiments may also be generalized to other grid systems, such as rectangular or triangular grid systems.

The systems, methods, and other embodiments described herein includes an effective process for drastically reducing the amount of data to be persisted for large hexagon datasets by use of efficient filtering, the intrinsic hexagonal-index hierarchy, and a common-ancestor-based packing scheme. The approach also includes constructing visualizable resolution layer of point-aggregated hexagons, by dynamically (that is, at runtime and as needed) constructing hexagon features tailored for vector tiles, when the vector tiles are being rendered before serving to the user.

No action or function described or claimed herein is performed by the human mind. An interpretation that any action or function can be performed in the human mind is inconsistent with and contrary to this disclosure.

—Grid Systems for Geospatial Indexing—

Grid systems for geospatial indexing (such as H3) provide well-defined cells to aggregate datapoints over irregular and changeable geographic areas, for example postal code areas. Visualization and analysis of location-specific data may be performed by bucketing or parceling locations in a spatial grid, where each grid unit forms a bucket that includes an aggregate of the location-specific data for all locations enclosed in the grid unit. For simplicity, cells in the grid should be a polygon that tiles regularly, such as triangle, rectangle, or a hexagon.

Hexagon grid systems for geospatial indexing (such as H3) provide an advantage over grid systems with other cell shapes (such as triangles and rectangles) in that individual hexagonal cells are equidistant to all neighboring or adjacent hexagonal cells of the grid, as compared to rectangle/square cells which have two possible distances between neighbors, and compared to triangle cells, which have three possible distances between neighbors. This property of equidistance in a grid of regular hexagons is conveniently straightforward and reduces complexity of implementation for geospatial indexing. Although the systems, methods, and other embodiments for database-centric aggregation of large-volume data points and generation of geospatial grid cells for encoding in vector tiles for visualization are generally described herein with reference to hexagons and hexagonal grids, in one embodiment, the systems, methods, and other embodiments may also be applied to grid systems with other cell shapes, such as triangles and rectangles.

H3 geospatial indexing system is a global grid system that provides a multi-precision hexagonal tiling of the surface of the earth. FIG. 1A illustrates a globe 100 partitioned by a hexagonal grid 105 in accordance with the H3 geospatial indexing system. H3 uses a hexagonal grid that partitions the entire earth and can be subdivided hierarchically into finer and finer hexagonal grids. H3 is configured to provide 16 precision resolution levels, ranging from coarsest resolution level 0 to finest resolution level 15. Coarsest resolution 0 contains 122 cells (of approximately 4.2 million square kilometers) covering the entire surface of the earth. The finest resolution, resolution 15, has cells with an area of less than 1 sq. meter (approximately 0.1 square meters in area).

Figure 1B:
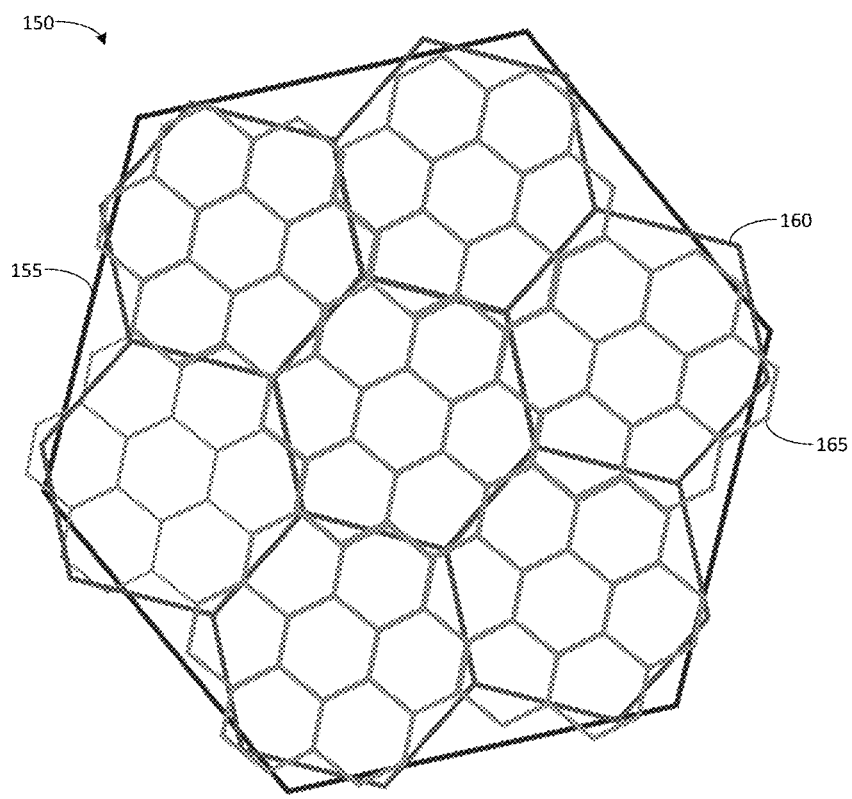
FIG. 1B illustrates an example 150 of three resolution levels of hexagon cells

All progressively finer resolutions beyond coarsest resolution 0 are created by splitting each cell in the preceding coarser resolution into 7 equal child cells. Thus, every hexagonal cell, up to the maximum supported resolution, has seven child cells below it in the hierarchy, a subdivision relationship referred to as "aperture 7", referring to the number of cells in the next finer resolution grid for each cell. In aperture 7, as resolution increments, (i) each hexagon has ⅐ the area of a hexagon at the next coarser hexagon, and (ii) the unit length of each hexagon is the unit length of a hexagon at the next coarser resolution divided by the product of seven and the square root of 7. For example, FIG. 1B illustrates an example 150 of three resolution levels of hexagon cells. In example 150, a coarsest cell 155 includes seven finer cells 160. Each of finer cells 160 include seven still finer cells 165. In this way, a hexagonal cell has seven child cells below it through a hierarchy of 16 resolution levels, based on the precision (with regard to the surface area covered) of the hexagons.

Each of the spatial hierarchical hexagon cells in a hexagon grid geospatial indexing system are uniquely identified by an index, or hexagon ID. In the H3 system, the indexes are designed such that geographically close locations will tend to have numerically close indexes. Therefore, hierarchical traversals (child-to-parent and parent-to-child hexagons), are in essence a change in precision/resolution level of the hexagon and are achieved by only a few bitwise operations on the hexagon ID itself, making the operation very fast. In one embodiment, the hexagons are indexed using mode 1 of the H3 Index. Mode 1 of the H3 Index is a 64-bit integer description of a hexagon cell in a hexagon grid. The first 8 bits of the index integer are reserved. The next 4 bits indicate cell resolution 0-15. The next 7 bits indicate the base cell (or coarsest resolution cell in which the cell indicated by the index integer occurs) 0-121. The remaining 45 bits are a series of 15 3-bit digits indicating (with digits 0-6) in which of the seven child hexagons the cell indicated by the index integer occurs at progressively finer resolutions (resolutions 1-15).

Figure 2:
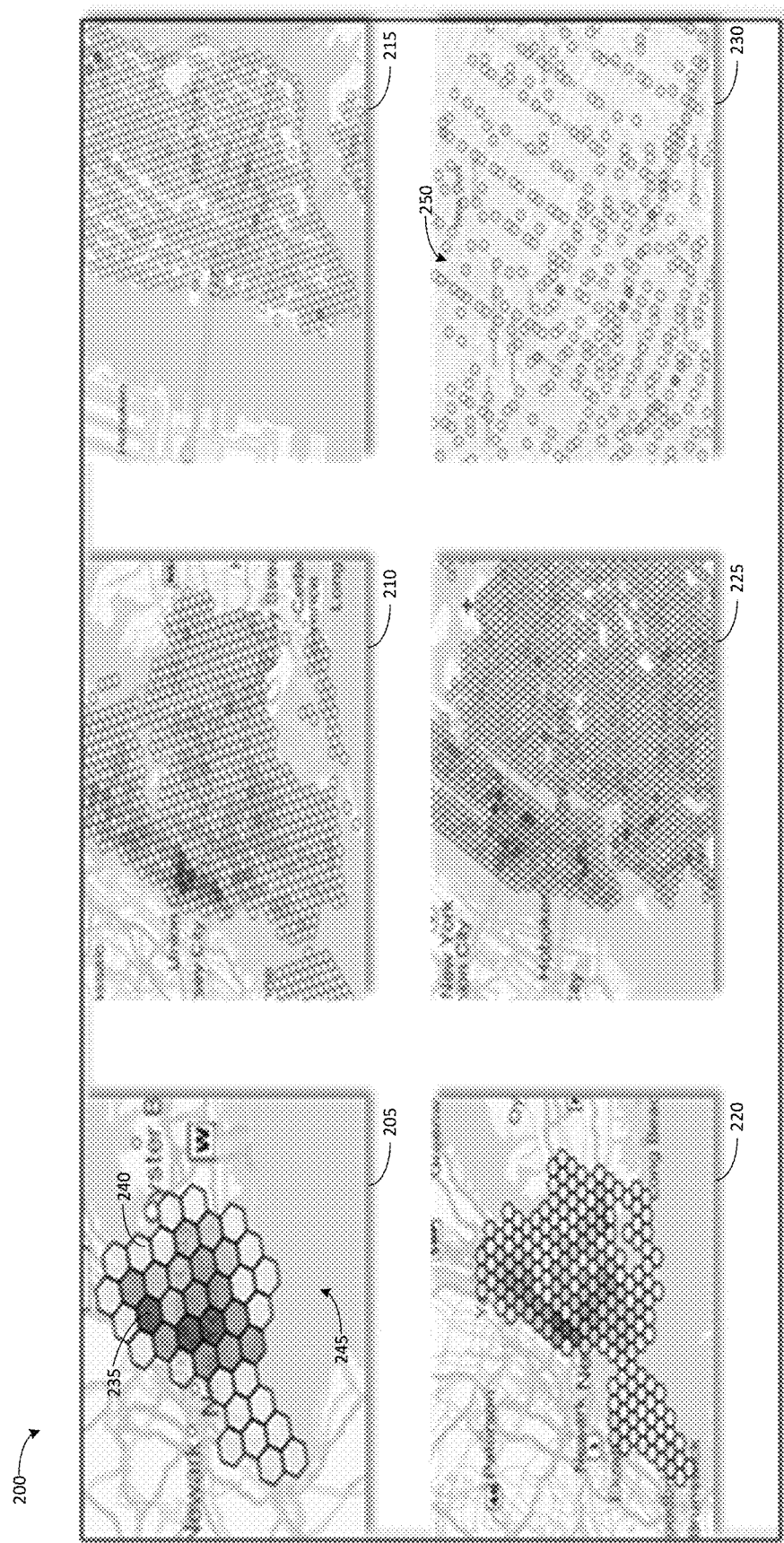
FIG. 2 illustrates example dataset aggregations 200 projected on a map at various resolutions, for example as shown in a GUI associated with generation of aggregate data geospatial grid cells for encoding in vector tiles.

The indexing system (for example, H3) being a hierarchical set of hexagonal grids enables aggregation of location data at different precision levels. Thus, a point dataset can be aggregated in hexagonal grids at various resolution levels, providing analytical view or summarization of the data on different geographical levels (such as at block, city, county, state, country, or even continent levels). An example hexagonal visualization tool provides a user with an ability to visualize a dataset on a map as aggregated by hexagons and transition from one resolution to another as and when the user zooms in or out on the map. FIG. 2 illustrates example dataset aggregations 200 projected on a map at various resolutions, for example as shown in a GUI associated with generation of aggregate data geospatial grid cells for encoding in vector tiles. The various resolution levels shown include aggregations at resolution level 4 205, resolution level 5 210, resolution level 6 215, resolution level 7 220, resolution level 8 225, and resolution level 9 230. Higher density of occurrence of a data point within a hexagon may be shown in visualization by more intense shading on the hexagon, such as shown at level 4 205 hexagon 235. Lower density of occurrence of a data point within a hexagon may be shown in visualization by less intense shading on the hexagon, such as shown at level 4 205 hexagon 240. Non-occurrence of a data point in a hexagon may be shown in visualization by non-display of a hexagon, such as at empty tiles 245 in the level 4 205 visualization, or the empty tiles between hexagons 250 visible in resolution level 9 230 visualization. Occurrence of data points in hexagons at finer resolutions (overlaid on higher zoom levels of the map) are aggregated in hexagons of coarser resolutions that include the finer resolution hexagons.

—Selected Technical Challenges—

A naïve, brute force solution to build the example hexagonal visualization tool would: (1) persist all possible hexagons containing data points, grouped by resolution level of the hexagon; and (2) for each resolution level, (a) perform a spatial join query between the point dataset and all hexagons of that resolution level to find hexagons containing data points, and (b) aggregate each resultant hexagon, with all the points contained by them, either by simple count (of number of data points), or a specific attribute (such as quantity of units at each data point).

This naïve, brute force solution is not technically feasible for a number of reasons. First, the number of hexagons increases exponentially with resolution level. Over the 16 resolution levels, this implies a requirement of persisting on the order of 100 trillion of hexagon cells, with an expectation of utilizing very few of these per dataset. This would rapidly exhaust the memory capacity of any cloud computing infrastructure. Second, multiple complex queries per dataset are used to retrieve the hexagons based on the aggregations required for each resolution level. Execution of these queries slows the pace of aggregation to an extent inconsistent with real-time visualization of aggregated hexagons. Third, each of resolution level so constructed will be required to be cached in-memory, to support smooth transitions between different map zoom levels during visualization. Thus, when the data volume for a point dataset is large, it becomes practically infeasible to aggregate the data points in hexagons for all resolutions. Moreover, because visualizing the hexagons on an ad-hoc basis requires a significant amount of preparation to pre-generate the hexagons and doing so naively for each h3 resolution is tremendously costly, this results in a very slow and clumsy visualization process, to the point that real-time, exploratory-type data analysis cannot be carried out using aggregated hexagon visualizations. In this way, the naïve, brute force solution does not provide a tool that provides the rapid, real-time response needed for visualization of a dataset on a map as aggregated by hexagons that can transition from one resolution to another in response to user inputs to zoom in or out on the map.

One attempted solution for such a visualization is to let users pick and choose resolution layers for which they want to aggregate and persist hexagons. Multi-scale hexagons can thus be created that turn on as the user zooms in or out on the map, such that the user sees only data appropriate at a given_resolution. Such a solution is not automated: it does not transparently support all resolutions requires that the user needs to expertly determine, in advance of visualization, which hex resolution will be best for a particular dataset. The data requirements are only reduced by selection and exclusion of the resolution levels. If data at all resolution levels is chosen to be persisted by the user, this attempted solution will be analogous to the brute force solution discussed above. Thus, the attempted solution also fails to provide the rapid, real-time response needed for visualization of a dataset on a map as aggregated by hexagons that can transition from one resolution to another in response to user inputs to zoom in or out on the map that is needed for exploratory-type data analysis.

Example Environment

Figure 3:
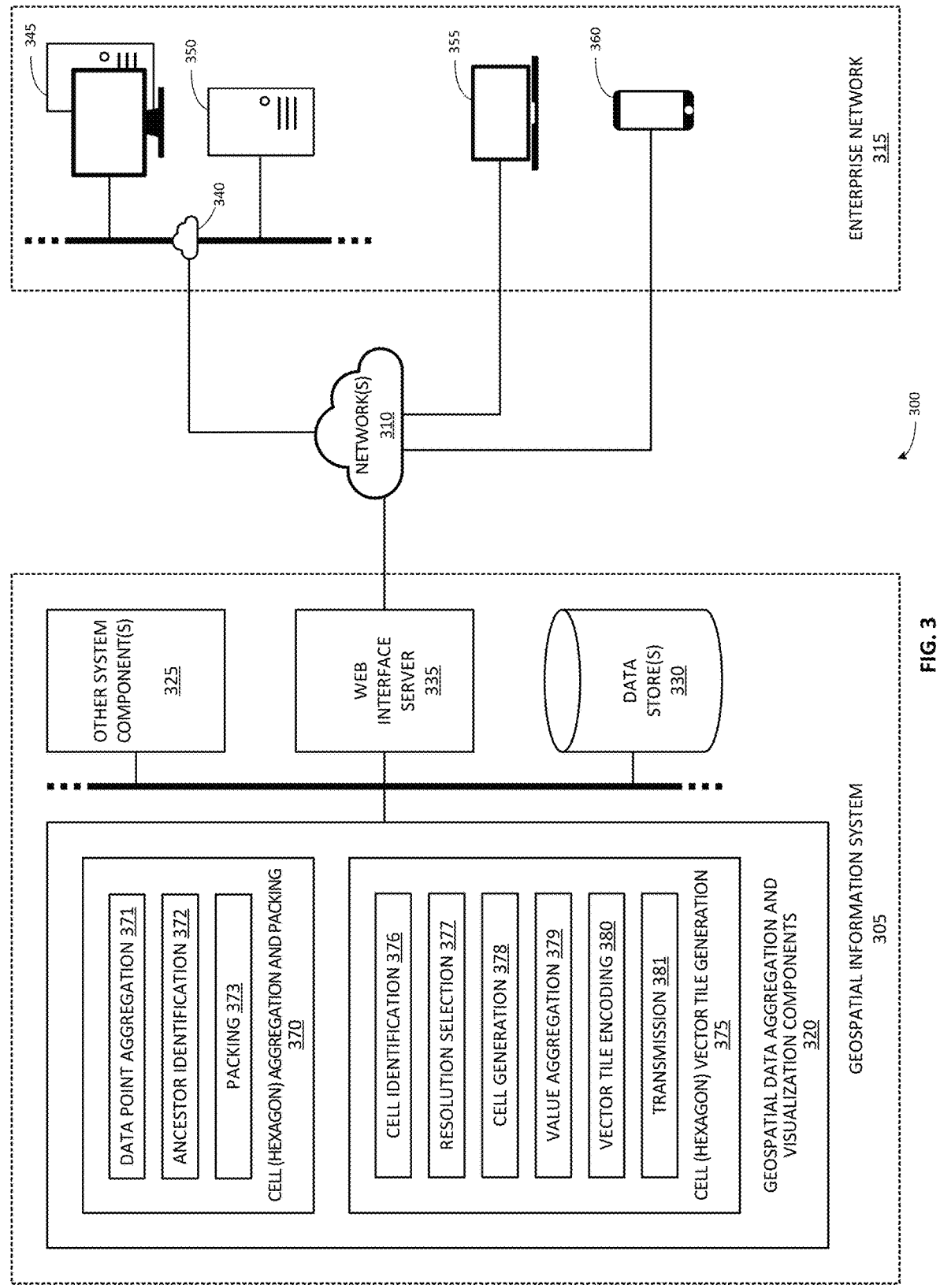
FIG. 3 illustrates one embodiment of a system 300 associated with generation of aggregate data geospatial grid cells for encoding in vector tiles.

FIG. 3 illustrates one embodiment of a system 300 associated with generation of aggregate data geospatial grid cells for encoding in vector tiles. In one embodiment, system 300 includes a geospatial information system 305 connected by the Internet 310 (or another suitable communications network or combination of networks) to an enterprise network 315.

In one embodiment, geospatial information system 305 includes various systems and components which include geospatial data aggregation and visualization components 320, other system components 325, data store(s) 330, and web interface server 335. In one embodiment, other system components 325 may include geospatial indexing components such as an H3 hexagonal hierarchical spatial index implementation for recording and indexing data points or other data items by geospatial location. In one embodiment, other system components 325 may further include user administration modules for governing the access of users to geospatial information system 305.

Each of the components of geospatial information system 305 is configured by logic to execute the functions that the component is described as performing. In one embodiment, the components of geospatial information system 305 may be implemented as sets of one or more software modules executed by one or more computing devices specially configured for such execution. In one embodiment, the components of geospatial information system 305 are implemented on one or more hardware computing devices or hosts interconnected by a data network. For example, the components of geospatial information system 305 may be executed by network-connected computing devices of one or more compute hardware shapes, such as central processing unit (CPU) or general purpose shapes, dense input/output (I/O) shapes, graphics processing unit (GPU) shapes, and high-performance computing (HPC) shapes. In one embodiment, the components of geospatial information system 305 are implemented by dedicated computing devices. In one embodiment, the components of geospatial information system 305 are implemented by a common (or shared) computing device, even though represented as discrete units in FIG. 3. In one embodiment, geospatial information system 305 may be hosted by a dedicated third party, for example in an infrastructure-as-a-service (IAAS), platform-as-a-service (PAAS), or software-as-a-service (SAAS) architecture.

In one embodiment, the components of system 300 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Each component of system 300 may (i) generate or compose an electronic message or signal to issue a command or request to another component, (ii) transmit the message or signal to other components of computing system 300, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems (such as those of enterprise network 315) may access information or applications provided by geospatial information system 305 through web interface server 335. In one embodiment, the remote computing system may send requests to and receive responses from web interface server 335. In one example, access to the information or applications may be effected through use of a web browser on a personal computer 345, remote user computers 355 or mobile device 360. For example, these computing devices 345, 355, 360 of the enterprise network 315 may request web GUI applications for visualization of data points, for example visualization along with mapping tiles in a mapping application. In one example, communications may be exchanged between web interface server 335 and personal computer 345, server 350, remote user computers 355 or mobile device 360, and may take the form of remote representational state transfer (REST) requests using JavaScript object notation (JSON) as the data interchange format for example, or simple object access protocol (SOAP) requests to and from XML servers.

The REST or SOAP requests may include API calls to components of geospatial information system 305. For example, computers 345, 350, 355 of the enterprise network 315 may request retrieval of visualized data points for display, for example in one or more mapping applications.

Enterprise network 315 may be associated with a business. For simplicity and clarity of explanation, enterprise network 315 is represented by an on-site local area network 340 to which one or more personal computers 345, or servers 350 are operably connected, along with one or more remote user computers 355 or mobile devices 360 that are connected to enterprise network 315 through network(s) 310. Each personal computer 345, remote user computer 355, or mobile device 360 is generally dedicated to a particular end user, such as an employee or contractor associated with the business, although such dedication is not required. The personal computers 345 and remote user computers 355 can be, for example, a desktop computer, laptop computer, tablet computer, or other device having the ability to connect to local area network 340 or Internet 310. Mobile device 360 can be, for example, a smartphone, tablet computer, mobile phone, or other device having the ability to connect to local area network 340 or network(s) 310 through wireless networks, such as cellular telephone networks or Wi-Fi. Users of the enterprise network 315 interface with geospatial information system 305 across network(s) 310.

In one embodiment, data store 330 is a computing stack for the structured storage and retrieval of one or more collections of information or data in non-transitory computer-readable media, for example as one or more data structures. In one embodiment, data store 330 includes one or more databases configured to store and serve information used by geospatial information system 305. In one embodiment, data store 330 includes one or more databases configured to store and serve geospatial indexing data, data indexed by the geospatial indexing data, and large data objects (such as CLOBs) for storing hexagons grouped by common ancestor, as shown and described herein. In one embodiment, the database is an Oracle® database. In some example configurations, data store(s) 330 may be implemented using one or more Oracle® Exadata compute shapes, network-attached storage (NAS) devices and/or other dedicated server device.

In one embodiment, geospatial data aggregation and visualization components 320 include one or more components configured for implementing methods, functions, and features described herein associated with generation of aggregate data geospatial grid cells for encoding in vector tiles. In one embodiment, the components and subcomponents of geospatial data aggregation and visualization components 320 may be implemented as one or more modules.

In one embodiment, geospatial data aggregation and visualization components 320 includes cell (hexagon) aggregation and packing components 370. In one embodiment, cell (hexagon) aggregation and packing components 370 includes a data point aggregation module 371 to aggregate the set of finest-resolution cells (hexagons) and associated aggregate data values from a point dataset as shown and described herein. In one embodiment, cell (hexagon) aggregation and packing components 370 includes an ancestor identification module 372 to determine common ancestors of the finest-resolution cells (hexagons) at a coarser hexagon resolution level as shown and described herein. In one embodiment, cell (hexagon) aggregation and packing components 370 includes a packing module 373 to, for the common ancestors, store a group of finest-resolution cells (hexagons) having a common ancestor in a data structure discrete from data structures storing cells (hexagons) having with other common ancestors as shown and described herein.

In one embodiment, geospatial data aggregation and visualization components 320 includes cell (hexagon) vector tile generation components 375. In one embodiment, cell (hexagon) vector tile generation components 375 includes a cell (hexagon) identification module 376 to identify a subset of finest-resolution cells (hexagons) contained by a vector tile in a set of finest-resolution cells (hexagons) and their associated aggregate data values as shown and described herein. In one embodiment, cell (hexagon) vector tile generation components 375 includes a resolution selection module 377 to select a cell (hexagon) resolution level based on a zoom level of the vector tile 377 as shown and described herein. In one embodiment, cell (hexagon) vector tile generation components 375 includes a cell (hexagon) generation module 378 to generate a new cell (hexagon) at the cell (hexagon) resolution level based on cell (hexagon) IDs of the subset of finest-resolution cells (hexagons) as shown and described herein. In one embodiment, cell (hexagon) vector tile generation components 375 includes a value aggregation module 379 to generate a total aggregate data value for the new cell (hexagon) based on associated aggregate data values of the subset of finest-resolution cells (hexagons) as shown and described herein. In one embodiment, cell (hexagon) vector tile generation components 375 includes a vector tile encoding module 380 to encode the new cell (hexagon) and total aggregate data value in the vector tile as shown and described herein. In one embodiment, cell (hexagon) vector tile generation components 375 includes a transmission module 381 to transmit the encoded vector tile to a client to cause the vector tile and the new cell (hexagon) to be displayed as shown and described herein.

—Example Algorithm for Hexagonal Visualization—

In one embodiment, each step of computer-implemented methods described herein may be performed by a processor (such as processor 1110 as shown and described with reference to FIG. 11) of one or more computing devices (i) accessing memory (such as memory 1115 and/or other computing device components shown and described with reference to FIG. 11) and (ii) configured with logic to cause the system to execute the step of the method (such as aggregate data geospatial grid cell generation and encoding logic 1130 shown and described with reference to FIG. 11). For example, the processor accesses and reads from or writes to the memory to perform the steps of the computer-implemented methods described herein. These steps may include (i) retrieving any necessary information, (ii) calculating, determining, generating, classifying, or otherwise creating any data, and (iii) storing for subsequent use any data calculated, determined, generated, classified, or otherwise created. References to storage or storing indicate storage as a data structure in memory or storage/disks of a computing device (such as memory 1115, or storage/disks 1135 of computing device 1105 or remote computers 1165 shown and described with reference to FIG. 11, or in data stores 330 shown and described with reference to FIG. 3).

In one embodiment, each subsequent step of a method commences automatically in response to parsing a signal received or stored data retrieved indicating that the previous step has been performed at least to the extent necessary for the subsequent step to commence. Generally, the signal received or the stored data retrieved indicates completion of the previous step.

Figure 4:
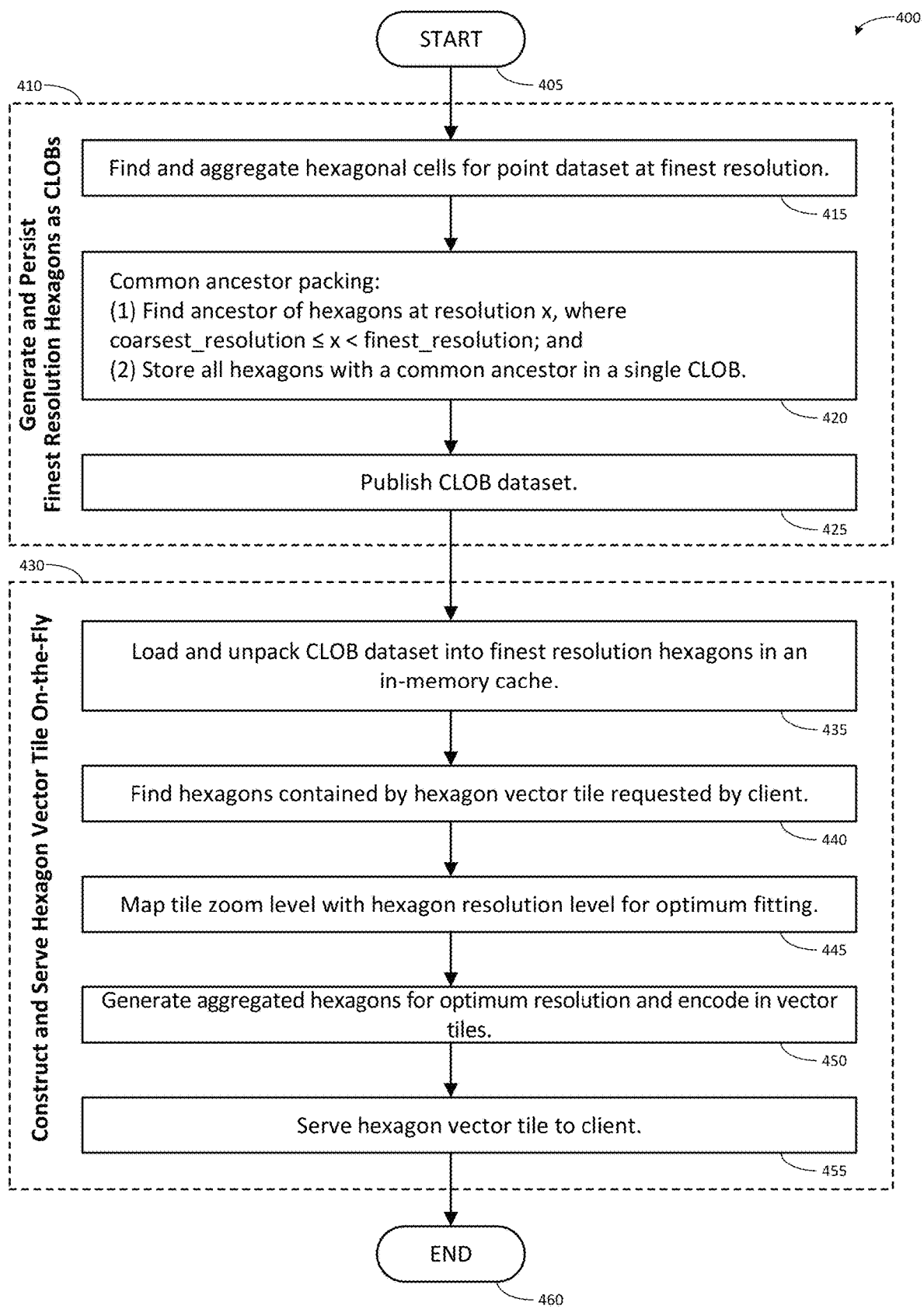
FIG. 4 illustrates one embodiment of an algorithm or method 400 for hexagonal visualization associated with generation of aggregate data geospatial grid cells for encoding in vector tiles.

FIG. 4 illustrates one embodiment of an algorithm or method 400 for hexagonal visualization associated with generation of aggregate data geospatial grid cells for encoding in vector tiles. The method 400 may be initiated automatically based on various triggers, such as in response to receiving a signal over a network or parsing stored data indicating that (i) a user (or administrator) of system 300 has initiated method 400, (ii) that method 400 is scheduled to be initiated at defined times or time intervals, (iii) that a point dataset and one or more aggregation criteria have been provided (for example by retrieval from storage), (iv) that a client system has requested performance of method 400, or (v) some other trigger occurs. The method 400 initiates at START block 405 in response to parsing a signal received or stored data retrieved and determining that the signal or stored data indicates that the method 400 should begin.

Processing continues from start block 405 to first phase 410 for generation and persistence of finest resolution hexagons as large objects (LOBs) such as character large objects (CLOBs) or binary large objects (BLOBs). A CLOB is a data type storing a large amount (for example, up to 4 GB) of character data, including character encoding to define a character set and representation of each character. A BLOB is a data type similar to a CLOB that consists of unformatted binary data, without character encoding. These large objects are used where other data types for storing character information (such as char, varchar, and text objects) are not large enough to contain a database field.

Note that in the worst case (of an H3-based implementation), where each resolution 15 (finest resolution in H3) hexagon contains at least one data point, there are a total of 569,707,381,193,162 hexagons. Were these hexagons to be persisted in a table using one hexagon per row, it would induce a huge insertion overhead cost and lead to an unmanageable table size. In one embodiment, therefore, the hexagons are stored using a novel and efficient method of packing nearby hexagons together in files by a common ancestor scheme. "Common", as used herein, refers to something shared by or belonging to more than one entity; in particular, a "common ancestor" as used herein refers to a coarser-level hexagon cell that encompasses or includes a group of more than one finer resolution hexagon cells—the coarser-level hexagon is a "common ancestor" of the group of finer-resolution hexagons. "Packing", as used herein, refers to placing data into an otherwise unstructured LOB (such as a CLOB) value using a particular format, in this case a sequence of hexagon IDs and associated aggregation values. The CLOB may be "unpacked" by extracting and interpreting or parsing the value of the CLOB to identify the individual data—the hexagon indexes and associated aggregation values—within the CLOB value.

In the common-ancestor packing configuration, all finest resolution hexagons with a common ancestor at a resolution x, where resolution x is between the coarsest and the finest resolutions (for example, 0≤x<15 when using H3) are packed in a single CLOB. A set of finest-resolution hexagons have a common ancestor at a given_resolution x where one resolution x hexagon includes the set of finest resolution hexagons. The common-ancestor packing method significantly reduces the amount of data to be persisted and significantly reduces the database operation (such as search, retrieval, or insertion) overhead. In one embodiment, where the indexing system is H3, for the case where x=0, the total number of hexagons are 122. Therefore, even in the worst case, the total of 569,707,381,193,162 hexes will only have 122 CLOBs (or fewer, for smaller datasets in which datapoints do not exist in one or more of the 122 coarsest-resolution hexagons). Because hexagon geometries can be generated by just their IDs (from the final 52 bits of the 64-bit integer used to describe the position of the hexagon), each CLOB contains (hexagon ID, aggregation value) pairs only. For each raw point dataset, the system needs only to create and store a companion table of hexagon CLOBs.

In one embodiment, first phase 410 is performed by hexagon aggregation, storage, and packing components 370 of geospatial information system 305. First phase 410 commences with process block 415, in which the processor finds and aggregates hexagonal cells for the provided point dataset at the finest resolution level of the hexagon grid system for geospatial indexing. In one embodiment, the systems, methods, and other embodiments herein exploits the hierarchical properties of certain geospatial indexes, such as H3, including support for traversal between levels of hierarchy, as discussed in further detail herein. In one embodiment, the processor aggregates the set of finest-resolution hexagon cells and associated aggregate data values from a point dataset. In one embodiment, where the hexagon grid system is H3, the processor finds and aggregates hexagonal cells for the point dataset at resolution 15. In one embodiment, resolutions other than the finest resolution level are to be built dynamically using a bottom-up approach, with only the highest-level resolution (finest resolution) hexagons being aggregated and stored in a database table. Therefore, for each point dataset, the finest resolution is constructed and aggregated in a single sweep using a single database query.

In one embodiment, the query to construct and aggregate retrieves those finest resolution hexagons that contain at least one point from the point dataset. In one embodiment, this filtered subset of finest resolution hexagons may be retrieved by executing the following query against the point dataset:

SELECT geometry, unit FROM point dataset;

$h3$ Index=lonlatToH3(geometry.lon,geometry.lat,
    H3_MAX_RESOLUTTON);

indexes.put(h3 Index, indexes.get(h3 Index)+unit);
where
  "geometry" indicates geographic coordinates of a data point;
  "unit" indicates an attribute of interest for visualization (in other words, a datapoint, such as a quantity of units);
  "point_dataset" is an example point dataset; "h3Index" is an index for a finest-resolution hexagon at a latitude and longitude of the geometry;
  "lonlatToH3 (given_longitude, given_latitude, given_resolution)" is a function configured to identify an H3 index for an H3 hexagon at a given resolution enclosing a given_longitude and latitude point;
  "geometry.lon" provides the given_longitude for the retrieved geometry to the "lonlatToH3 ( )" function;
  "geometry.lat" provides the given_latitude for the retrieved geometry to the "lonlatToH3 ( )" function;
  "H3_MAX_RESOLUTION" is the maximum (finest) resolution level in the geospatial indexing system chosen to be used by the user, for example having a value of "15" for maximum possible resolution in the H3 system, and provides the given_resolution to the "lonlatToH3 ( )" function;
  "indexes" is a companion table of CLOBs;
  ".put(location, character data)" is a function configured to write character data into a character data structure at a location; and ".get(index)" is a function configured to retrieve a value at a particular index.

Executing the "indexes.put(h3Index, indexes.get(h3Index)+ unit);" statement replaces the value (if any) at the provided h3Index in the indexes CLOB companion table with the sum of the value and the units, forming the initial aggregated units (if any) for each hexagon that includes a datapoint at the finest level of resolution. Where the provided h3Index is not present in the indexes CLOB companion table, and there is a value for unit, the h3Index and unit value is added to the CLOB. Where the provided h3Index is not present in the indexes CLOB, and there is no value for unit, no information is added to the CLOB.

Figure 5:
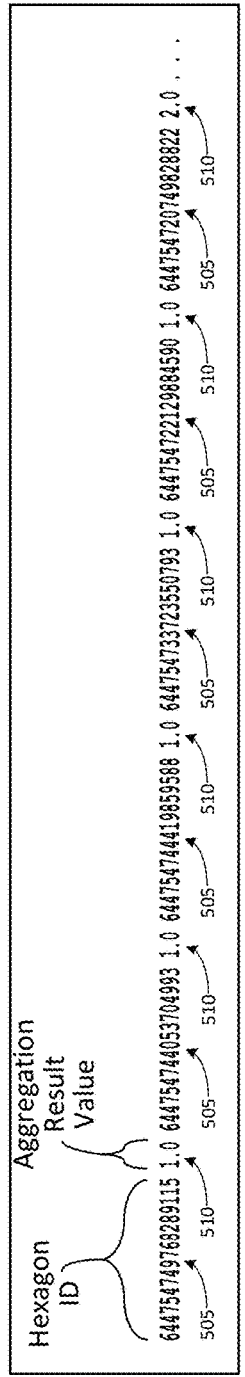
FIG. 5 shows an example CLOB 500 storing hexagon IDs 505 along with aggregation values 510 associated with generation of aggregate data geospatial grid cells for encoding in vector tiles.

Execution of the query produces a CLOB for the set of finest resolution hexagons which contain data points in the format shown in FIG. 5, as shown and described in further detail herein. Once the processor has thus completed finding and aggregating hexagonal cells for the provided point dataset at the finest resolution level, processing continues to process block 420.

First phase 410 continues with process block 420, in which the processor performs a common ancestor packing process. At process block 420, the processor determines common ancestors of the finest-resolution hexagons found at coarser hexagon resolution levels. In one embodiment, the processor finds an ancestor of hexagons at resolution x, where x is between the coarsest and finest resolutions of the of the hexagon grid system for geospatial indexing. For example, where the hexagon grid system is H3, the processor finds an ancestor of hexagons at resolutions from 0 up to 15. The processor then stores all hexagons with a common ancestor in a single CLOB. In one embodiment, one or more CLOBs of hexagons with a common ancestor is created for each resolution level of hexagons, or in other words, each group of hexagons in a resolution level having a common ancestor is assigned to a discrete CLOB. Due to the non-overlapping nature of the hexagons, no hexagon has more than one ancestor in the same level of resolution in common with other hexagons. In one embodiment, common ancestor packing reduces the overall number of CLOBs required because all hexagons in close vicinity of each other are packed together. "Close vicinity", as used herein with reference to hexagons or other grid cells, refers to hexagons packed together being spatially near to one another and having hexagon IDs similar to each other and to the common ancestor (as they all would contain the same base cell bits as well as may contain common digits for traversals from base cell to resolution of ancestor if chosen ancestor resolution is greater than 0). In one embodiment, the CLOBs are in the format shown in FIG. 5. FIG. 5 shows an example CLOB 500 storing hexagon IDs 505 along with aggregation values 510 associated with generation of aggregate data geospatial grid cells for encoding in vector tiles. Thus, in one embodiment, the set of finest-resolution hexagon IDs and their associated aggregate data values is a CLOB data structure in which each finest resolution hexagon IDs is immediately followed by their associated aggregate data value. Example CLOB 500 is a CLOB for hexagons with a particular common ancestor 515 at resolution 0. The CLOBs therefore contain the aggregated finest resolution hexagons that contain at least one point from a queried point dataset. In this way, for the common ancestors, the processor stores group of finest-resolution hexagons having a common ancestor in a data structure discrete from data structures storing hexagons having other common ancestors at the same resolution level. The processor thus stores a separate data structure of finest-resolution hexagons grouped by their common ancestor at each of the coarser resolution levels. Once the processor has thus completed performing a common ancestor packing process, processing continues to process block 425.

First phase 410 concludes with process block 425, in which the processor publishes the CLOB dataset. In one embodiment, each of the CLOBs for the resolution levels above the finest resolution level is stored in a data structure such as a table. The table is made available for subsequent retrieval and processing for generation of hexagon vector tiles, for example by storing a reference to the table in a location at which the processor is configured to access the CLOBs during generation of hexagon vector tiles. In this way, at the close of first phase 410, the set of finest-resolution hexagon IDs and their associated aggregate data values is recorded in a table of a CLOB data structures (i) that group the finest-resolution hexagons by common ancestor at each hexagon resolution level and (ii) in which each finest resolution hexagon ID is immediately followed by its associated aggregate data value. Once the processor has thus completed publishing the CLOB dataset, process block 425 and first phase 410 complete, and processing continues in second phase 430 at process block 435.

Once all the finest resolution hexagons are aggregated and stored in first phase 410, other hexagon resolutions may be constructed from the finest resolution hexagons using a bottom-up approach in a second phase 430. In one embodiment, second phase 430 is performed by dynamic hexagon vector tile generation components 375 of geospatial information system 305. In one embodiment, second phase 430 is configured to construct and serve hexagon vector tiles on-the-fly—that is, constructing the hexagon vector tiles from the CLOBs of finest resolution hexagons dynamically or as-needed in response to a query. In one embodiment, second phase 430 for dynamic generation of a hexagon vector tile is performed in response to a user/client request for hexagon visualization (a visualization including the hexagon vector tile).

Figure 6:
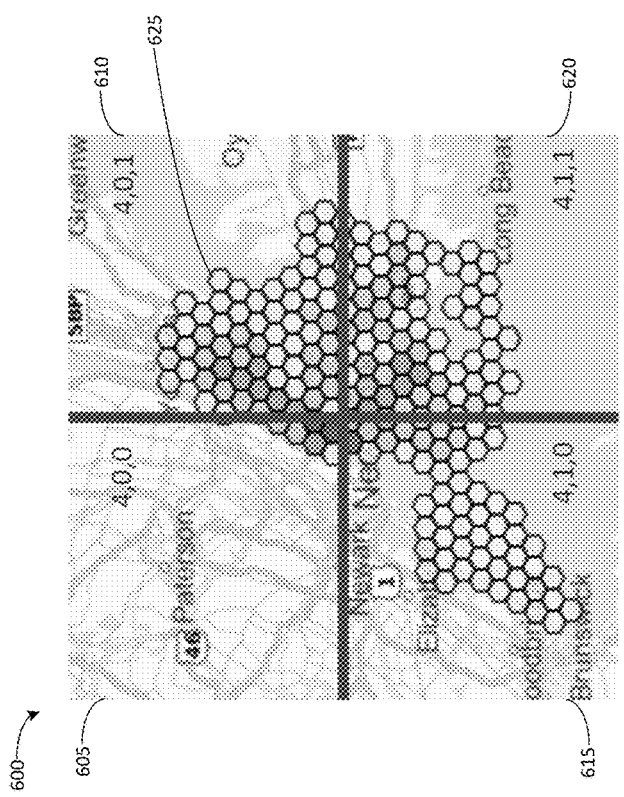
FIG. 6 shows an example map 600 (for example as may be presented in a GUI) associated with generation of aggregate data geospatial grid cells for encoding in vector tiles.

In one embodiment, a vector tile is a data structure used to render geographic maps data by breaking an entire map into tiles. Each tile is encoded by data that is spatially contained within its boundaries. A tile map service (TMS) may be configured to allow clients (such as computing devices, applications, processes, or methods) to request vector tiles for a geospatial location. Example TMSs include Google Maps, OpenStreet Maps, and Oracle Spatial Studio. Vector tiles may be tiles of a Web Mercator Projection (WMP) format map. Vector tiles may be retrieved from a TMS by a ZXY identifier for the tile. The Z of the ZXY identifier indicates a zoom level or magnification of the tile. The X and Y of the ZXY identifier indicates vector tile coordinates within that map zoom level, ranging from coordinates (0,0) to ($2^{zoom}-1, 2^{zoom}-1$). FIG. 6 shows an example map 600 (for example as may be presented in a GUI) associated with generation of aggregate data geospatial grid cells for encoding in vector tiles. Example map 600 shows a WMP map of a region in the vicinity of New York city. Example map 600 is shown using a set of four vector tiles at zoom level 4, indicating how a geographic maps dataset is split into vector tiles. (An entire world map—including example map 600—at zoom level 4 is made up of 256 vector tiles). At zoom level 4, example map 600 is divided into a set of four vector tiles. First vector tile 605 has ZXY coordinates 4,0,0; second vector tile 610 has ZXY coordinates 4,0,1; third vector tile 615 has ZXY coordinates 4,1,0; and fourth vector tile 620 has ZXY coordinates 4,1,1.

Hexagons 625 with geospatial coordinates within the vector tiles are overlaid on the vector tiles 605, 610, 615, 620 to form hexagon vector tiles.

In one embodiment, at process block 435, the processor loads and unpacks a CLOB dataset into finest resolution hexagons in an in-memory cache. In one embodiment, the hexagon CLOB table is retrieved and unpacked. The unpacked finest-resolution hexagons (including hexagon ID and aggregation value) are cached in memory for access and subsequent processing. The unpacked finest-resolution hexagons correspond to the point dataset because hexagons that do not correspond to the point data set were not included in the CLOB. The in-memory cache of finest-resolution hexagons corresponding to the point dataset may be used to construct vector tiles embedded with hexagons of appropriate resolution. Once the processor has thus completed loading and unpacking the CLOB dataset into finest-resolution hexagons in the in-memory cache, processing at process block 435 completes and processing continues at process block 440.

At process block 440, the processor finds hexagons contained by a hexagon vector tile requested by a client. In one embodiment, the processor may identify a subset of finest-resolution hexagons contained by a vector tile in a set of finest-resolution hexagons and their associated aggregate data values. When a user/client requests a vector tile containing hexagons, finest-resolution hexagons are filtered to fit the bounds of the vector tile. The finest-resolution hexagons spatially contained within the vector tile are identified and selected. The geospatial indexing system is configured to provide latitude and longitude coordinates of a hexagon. The TMS is configured to provide latitude and longitude coordinates of the boundaries of a vector tile. In one embodiment, the processor: (a) requests and receives one of (i) the center coordinates or (ii) the boundary coordinates of a hexagon from the geospatial indexing system by submitting the hexagon ID to an appropriate API of the geospatial indexing system; (b) requests the boundary coordinates for the vector tile from an appropriate API of the TMS; (c) compares the coordinates for the hexagon to the boundary coordinates of the vector tile to determine whether the hexagon is within the boundary of the vector tile; and (d) records an indication that the hexagon is within or not within the boundary of the vector tile. This process may be repeated for more than one hexagon in a CLOB dataset, for example, for all hexagons in a CLOB dataset. Once the processor has thus completed finding the hexagons contained by the hexagon vector tile requested by the client, processing at process block 440 completes and processing continues at process block 445.

At process block 445, the processor maps the tile zoom level with hexagon resolution level for optimum fitting. In one embodiment, the processor selects a hexagon resolution level based on a zoom level of the vector tile. It is visually undesirable to overcrowd a vector tile with smaller hexagons, which causes the visualized data to become visually indistinct. It is also visually undesirable to allow the hexagons to be too large within a tile because the hexes at the edge would be omitted awkwardly and abruptly. A hexagon resolution level with optimum fitting for a vector tile does not cause either of these undesirable outcomes, instead falling between these two extremes. To ensure optimum fitting of hexes in a vector tile, an appropriate hexagon resolution level for visualizing hexagons given the tile zoom level of the vector tile is found. Appropriate or suitable hexagon resolutions ensure that a vector tile includes a visually acceptable number of hexagons.

In one embodiment, the resolution level is found using a line estimation algorithm. In one embodiment, the line estimation algorithm is a metric estimation used to map hexagon cells on vector tiles. For example, this may be a simple fitting estimation of the following form: Given the dimensions of the vector tile to be encoded and the average size of hexagon cell at each resolution, determine at what hexagon resolution we can fit a number 'n' of hexagons on the longer edge of the tile. This gives a rough estimate on how many hexagons a vector tile can accommodate without appearing either too crowded (with excessively many hexagons), or too awkward (with excessively large hexagons). The correlation threshold 'n' may be a pre-determined, administrator-adjustable constant. The actual threshold 'n' may be decided based on trial and error, based on the dimensions of vector tiles generated by the TMS. In one embodiment, where the TMS is Oracle Spatial Studio, 'n' may be set to 6, allowing 6 whole adjacent hexagons to be placed along the long axis of the vector tile.

In one embodiment, the unit length of hexagons (discussed) at each hexagon resolution level is multiplied by correlation threshold n, and compared to the length of long edges of the vector tile at a zoom level. In one embodiment, the processor determines a length of a longest edge of the vector tile at the zoom level, for example by comparison among the edges of the vector tile, and determine the hexagon resolution level at which a predetermined number—the correlation threshold 'n'—of hexagons may be placed along the longest edge in order to select the hexagon resolution level. The coarsest hexagon resolution at which the product of hexagon unit length and correlation threshold does not exceed the long axis length of the vector tile is identified, and set as the optimum hexagon resolution for that zoom level. This process may be repeated for each zoom level of the vector tiles, and the results stored in a data structure for later lookup and retrieval.

Figure 7:
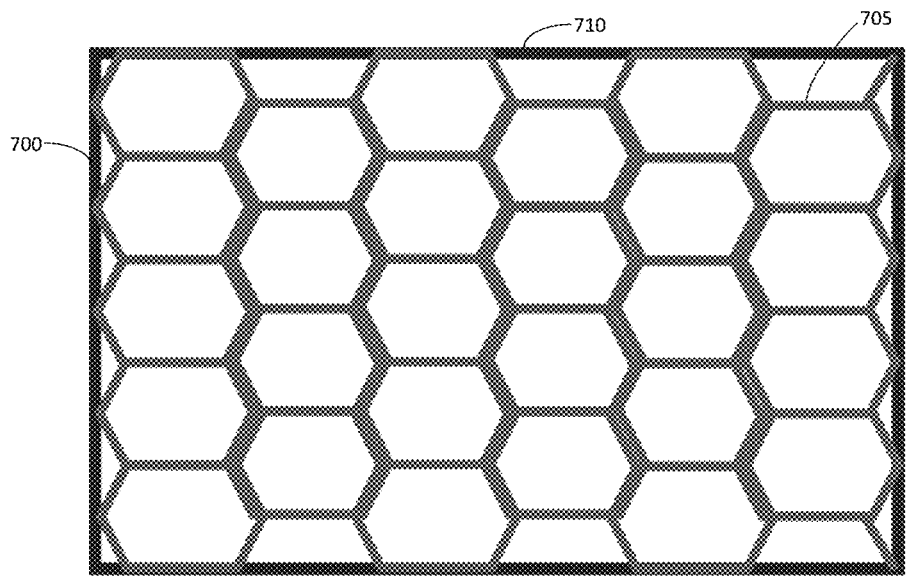
FIG. 7 illustrates one example of a vector tile 700 associated with generation of aggregate data geospatial grid cells for encoding in vector tiles.

FIG. 7 illustrates one example of a vector tile 700 associated with generation of aggregate data geospatial grid cells for encoding in vector tiles. Vector tile 700 is overlaid with hexagons 705 of a resolution level in which n=6 hexagons may be placed along long axis 710 of vector tile 700. In one embodiment, the ZXY coordinates of the vector tile are zoom 12, and coordinates within the map 3 and 2 (z/x/y=12/3/2). At vector tile 700 zoom level 12, the hexagon resolution at which n=6 hexagons may be placed along long axis 710 of vector tile 700 is 13. Thus, hexagons 705 are displayed in vector tile 700 at this optimum resolution of 13.

Identifying the hexagon resolution based on threshold 'n' correlates the two different resolution scales used to create the end visualization: map resolution (denoted by 'zoom' parameter in the vector tile notation) and the hexagon resolution laid out by the geospatial indexing system. Note that, in Oracle Spatial Studio, map resolution ranges from 0 to 23 while h3 hex resolution ranges from 0 to 15. So, the sizes of the two shapes: tiles and hexagons, vary differently as per their resolution scale, respectively. Thus, the correlation threshold 'n' provides a proper mapping between these two resolution scales, such that hexagon scaling is automated to fit with map zoom. This enables a user to simply zoom in/out on a graphically displayed map and view the hexagons also changing resolutions as they fit visually, with no overcrowding or abruptly cut out hexagons. This further eliminates any need for a user to have information about hexagons, h3 indexing systems, or vector tiling systems to know what hexagon resolution would be the best fit. This zoom, with automatically scaled hexagons generated on the fly, is enabled by the systems, methods, and other embodiments described herein, and was not previously possible for visualizations of geospatially indexed data.

Once the processor has thus completed mapping the tile zoom level with the hexagon resolution level for optimum fitting, processing at process block 445 completes and processing continues at process block 450.

At process block 450, the processor generates aggregated hexagon cells for the optimum resolution and encodes them in the vector tiles. In one embodiment, the processor generates new hexagon cells on-the-fly, as needed, at the hexagon resolution level based on hexagon cell IDs of the subset of finest-resolution hexagon cells.

In one embodiment, the ancestor hexagons at the fitted or optimum resolution of the filtered finest-resolution hexagons are found using bitwise operations on the hexagon IDs. In one embodiment, the bitwise operations involved are a combination of LEFT SHIFT, AND & OR operators. The ancestor hexagons at the optimum level are generated in two steps: (1) changing a resolution bit (one or more of the four resolution bits discussed above) from finest-resolution to the optimal resolution, and (2) trimming a traversal (or coordinate path) to the optimum level.

As discussed above, the H3 Index is a long integer that has different bits allocated to denote different functions. One subset of the bits of the H3 index is the 4 bits allocated for resolution. So, at this first step in generating the hexagons at the optimum resolution level is to change this resolution bit from the finest child resolution (resolution level 15) to the intended parent resolution level. For example, if generating a hexagon at level 8, the resolution bits would be change from 0b1111 to 0b1000.

Another subset of bits in H3 Index are the 52 bits allocated for the index coordinate bits. The coordinate bits are a set of 16 sequences of bits, an initial 7 bits to identify a base (coarsest resolution 0) hexagon, followed by 15 sequences of 3 bits each, three bits for each progressively finer resolution (1 to 15). These 52 index coordinate bits denote the entire parent-to-child traversal of the hexagons at each resolution level, and form a unique key for a hexagon in a geospatial indexing system. In accordance with aperture 7, at each resolution level the parent cell splits into 7 child cells. Each 3-bit sequence denotes a digit (0-6) to indicate which out of a parent's 7 children is picked at the next, finer level. So for a finest-resolution hexagon at resolution level 15, the index integer has all these index coordinate bits populated, describing the entire traversal from resolution 0 down to resolution 15. To generate the index of a hexagon at a target resolution above resolution 15, the index coordinate bits describing resolutions finer than the target resolution can be discarded. For example, to find a hexagon at resolution 8, the traversal path through described by the first 31 of the 52 index coordinate bits (for resolutions 0 to 8) are retained, and the rest are discarded.

Following these two steps the hexagon ID (h3 index) of the new, dynamically generated ancestor/parent hexagon is identified, with the new resolution bit set and the corresponding index coordinate bits are set for the resolution, denoting a traversal path to the ancestor/parent hexagon. Other bits in the complete H3 Index are not altered in this operation. A new hexagon at the optimum resolution is thus dynamically generated by the setting of the new resolution bit and the identification of the index coordinate bits for the hexagon at that resolution.

In one embodiment, the processor generates total aggregate data values for the new hexagon cells based on associated aggregate data values of the subset of finest-resolution hexagon cells. The dynamically generated hexagons at the optimum resolution aggregate—that is, combine together—the aggregated data point values of the finest-resolution hexagons that the generated hexagons contain. In one embodiment, the new (generated) hexagons are aggregated from the finest resolution hexagons by summing their child finest-resolution hexagons. In one embodiment, the processor determines the set of optimum resolution hexagons included in the vector tile, and retrieves their index numbers. The processor retrieves the CLOB file for the optimum resolution. For each member of the set, the processor parses the CLOB file to determine all hexagons that have coordinate bits that match coordinate bits of the member of the set down to the coordinate bits for the optimum resolution. For example, where a hexagon in the set is a resolution 13 hexagon, the processor will select all finest resolution hexagons in the CLOB where the coordinate bits match down through the first 46 of 52 coordinate bits; or, where a hexagon in the set is a resolution 8 hexagon, the processor will select all finest resolution hexagons in the CLOB where the coordinate bits match down through the first 31 of 52 coordinate bits. The processor retrieves from the CLOB the aggregate data value associated with each of these selected finest-resolution hexagons, and adds it to a total aggregation for the member of the set. In this way, the total aggregation for each of the optimum-resolution hexagons generated for the vector tile is generated on-the-fly from the CLOB.

Figure 8:
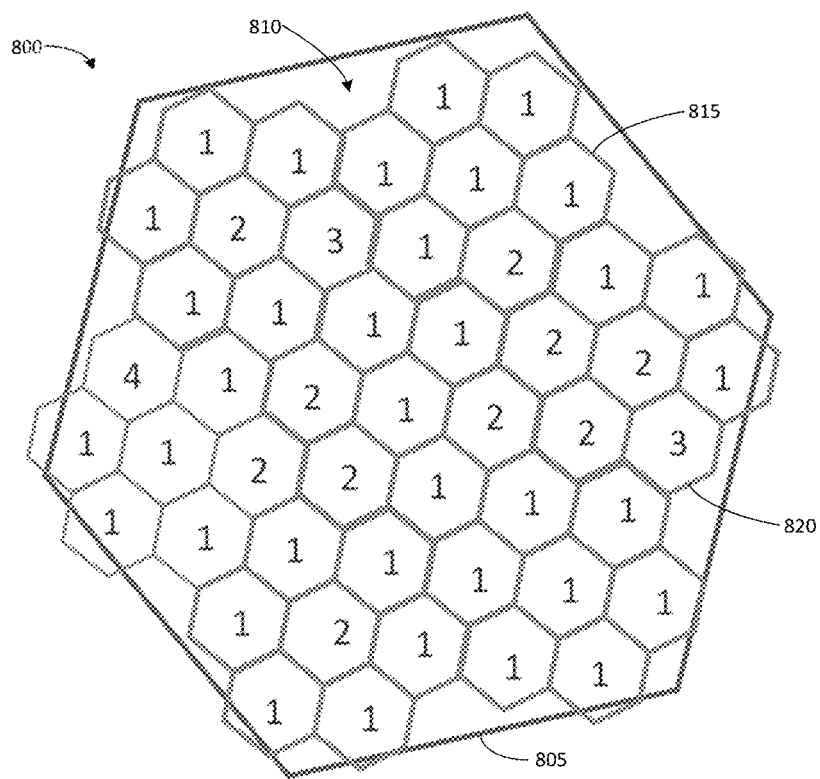
FIG. 8 illustrates an example of hexagons 800 at different resolutions associated with generation of aggregate data geospatial grid cells for encoding in vector tiles.

FIG. 8 illustrates an example of hexagons 800 at different resolutions associated with generation of aggregate data geospatial grid cells for encoding in vector tiles. Hexagon 805 is an ancestor hexagon to finest-resolution hexagons 810. As an ancestor, hexagon 805 is a coarser resolution hexagon that encompasses finest resolution hexagons 810. As shown, hexagon 805 is resolution 13 ancestor hexagon, and finest resolution hexagons 810 are resolution hexagons. In one embodiment, hexagon 805 is generated from finest-resolution hexagons 810, as discussed above. In one embodiment, each of finest resolution hexagons 810 has an associated aggregation value—a total of all data points occurring within the geospatial area encompassed by the finest resolution hexagon. For example, finest resolution hexagon 815 has an aggregation value of one unit, and finest resolution hexagon 820 has an aggregation value of three units. An aggregation value for generated hexagon 805 is derived as discussed above from the aggregation values for finest resolution hexagons 810. The total value of aggregation values over all of finest resolution hexagons 810 are retrieved from the CLOB for resolution 13 hexagons, and totaled to generate the aggregation value for hexagon 805. As shown, the aggregation value for hexagon 805 is 64 units.

In one embodiment, the processor encodes the new hexagons and their associated total aggregate data values into the vector tile. In one embodiment, the new (generated) hexagons at the optimum resolution are encoded in the vector tile as feature hexagon geometries. Vector tiles are data structures for encoding map and feature data. Graphical user interfaces (such as web map applications) can parse one or more vector tiles to generate and display the map and feature data, for example as a thematic map. In one embodiment, the processor accepts a vector tile generated by the TMS and inserts coordinate and attribute information describing the generated hexagons into the vector tile as a feature of the vector tile.

In one embodiment, on parallelly processing such vector tile requests, the resolution levels of the hexagon dataset is constructed as a whole. This provides a user an ability to transition from hexagonal grids at one resolution to another as and when they zoom in or out on the map.

As discussed above, the processor may generate multiple new hexagons at the hexagon resolution level to cover the area of the vector tile, generate total aggregate data values for those hexagons, and encode all the hexagons and total aggregate data values in the vector tile. Once the processor has thus completed generating the aggregated hexagons for the optimum resolution and encoding the generated hexagons in the vector tiles to create hexagon vector tiles, processing at process block 450 completes, and processing continues at process block 455.

At process block 455, the processor serves the hexagon vector tiles to the client. In one embodiment, the processor transmits the encoded vector tile to the client to cause the vector tile and the new, generated hexagons to be displayed. In one embodiment, the client is a map viewer, for example a map viewer included in Oracle Spatial Studio. The processor incorporates the vector tile with embedded hexagons into an electronic message, such as a REST request. The processor transmits the electronic message to the client application, for example a client application being executed on a client device, such as computing devices 345, 355, 360. In response to receiving the transmission, the client extracts the vector tile(s) from the message and displays the vector tile(s) with embedded hexagons. Thus, the transmission of the tile in the electronic message causes the display of the tile.

Once the processor has thus completed serving the hexagon vector tiles to the client, processing a process block 455 completes, second phase 430 concludes, and processing continues at END block 460, where method 400 terminates. Thus, over the course of second phase 430, the processor obtains the hexagons for the specific zoom level, and vector tile bounds, all from a small set of CLOB data.

Example Client GUI

Figure 9:
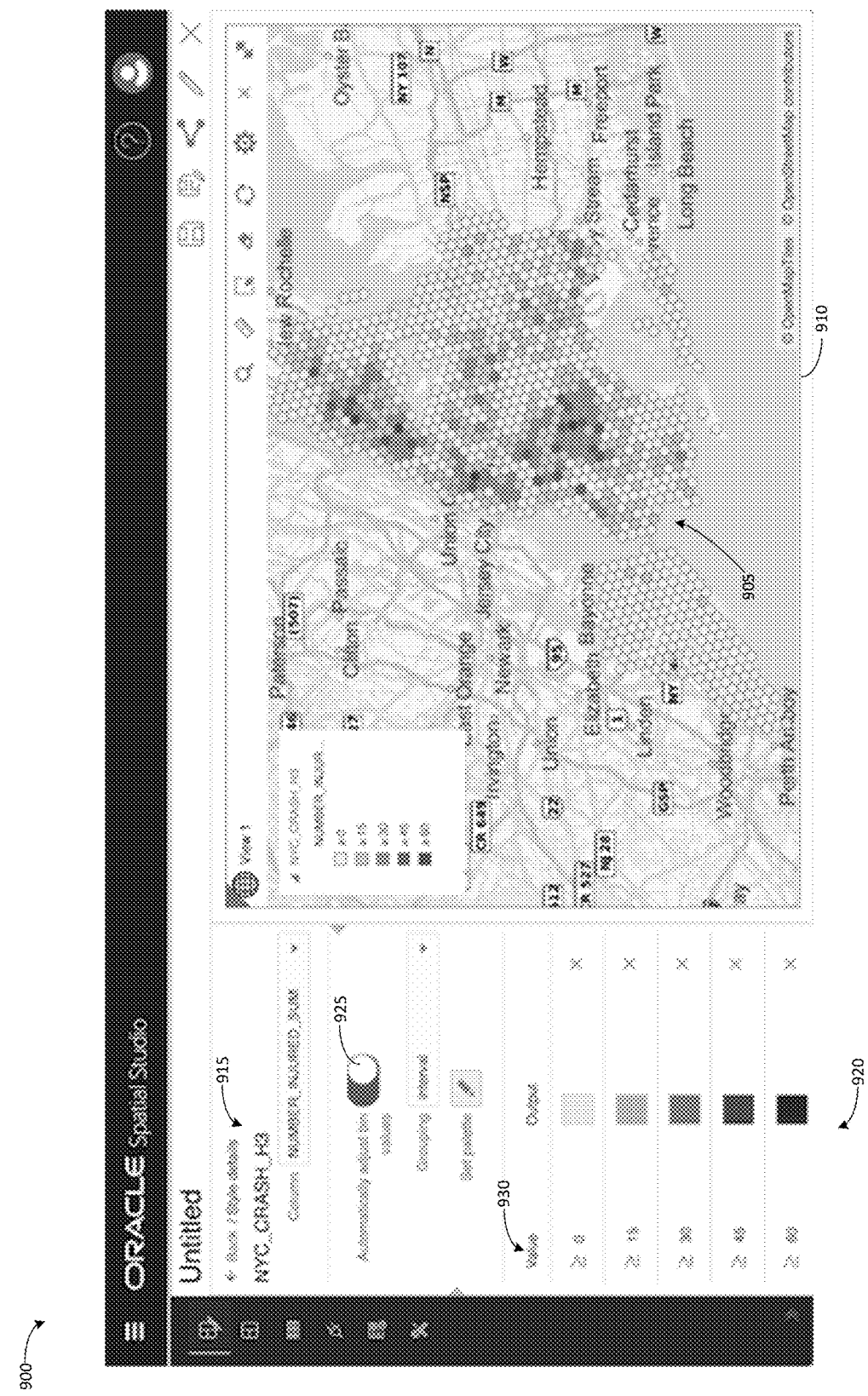
FIG. 9 illustrates an example client GUI 900 associated with generation of aggregate data geospatial grid cells for encoding in vector tiles that is displaying hexagonal aggregations 905 in a thematic map 910.

FIG. 9 illustrates an example client GUI 900 associated with generation of aggregate data geospatial grid cells for encoding in vector tiles that is displaying hexagonal aggregations 905 in a thematic map 910. Thematic map 910 is composed of vector tiles with embedded hexagons, generated as discussed above, and rendered by the client GUI 900. In this example, thematic map 910 shows injuries from car crashes occurring in New York City. The user may provide inputs to the client GUI, for example by mouse movements, mouse button(s) clicks, mouse wheel rotations, and/or keystrokes to select options from menus, enter text, select/deselect graphical buttons, check-boxes, radio buttons, or switches, scroll, or zoom in (increase resolution) or zoom out (decrease resolution) on a map.

Initially, a hexagonally indexed aggregation dataset may be prepared from a data source through a portion of the GUI. The user may provide inputs to select a column that indicates geometry in the data source for the dataset, such as "latitude&longitude". The user may choose to summarize the dataset by either count—which buckets the number of datapoints in each hexagon—or sum—which adds up the values for a specific column in the data set for all the points that fall in a specific hexagon. The user may select the column in the data source to summarize in the dataset, for example, "number_injured", in order to visualize the number of total injuries. The user may enter name for this hexagonally indexed dataset, for example, "NYC_CRASH_H3". Once the hexagonally indexed aggregation dataset is prepared, it may be opened by the client GUI 900, for example by entering the dataset 915 into the GUI 900.

In response to the dataset selection or opening by client GUI 900, client GUI 900 will request creation of vector tiles with embedded hexagon features to make up thematic map 910. The vector tiles are generated as described herein, and transmitted to the client for display as map 910. The processor displays the vector tiles and the encoded hexagons in GUI 900 as parts of thematic map 910. The user can therefore immediately see a map showing the number of injuries from car crashes binned into hexagons. The user may manipulate client GUI 900 to display map 910 at different resolutions, and the hexagon resolution will automatically adjust, as discussed above. This enables the user to zoom out on the thematic map 910 to view the overall big picture of the geospatially indexed data, or zoom in on the thematic map 910 to investigate the geospatially indexed data in greater detail. Client GUI 900 accepts a user input changing the zoom level, and presents it to the system 305, which triggers a refresh action in hexagon vector tile generation components 375. In response, hexagon vector tile generation components 375 automatically generate updated hexagons at an updated hexagon resolution level selected based on the changed zoom level, encode the updated hexagons in updated vector tiles (at the new zoom level), and transmit the updated vector tiles back to client GUI 900, in a manner substantially similar to the operations described with reference to second phase 430 for construction and serving of hexagon vector tiles on-the-fly.

In one embodiment, hexagonal cells 905 are color-coded based on the aggregate number of datapoints they hold, which enables a user to easily understand patterns in their data. The meaning of the color code may be presented in a key 920. In one embodiment, the processor displays the hexagons in map 910 in GUI 900 using a color associated with the total aggregate data value by the color code. In one embodiment, the colors are associated with total aggregate data values by assigning a color to a bin covering a range of total aggregate data values, for example assigning more intense colors to bins with higher total aggregate data values. The hexagonal cells and the distribution of points in these hexagons automatically change at each resolution level upon zoom in and out of the map, as discussed above. Therefore, the ranges of the color bins for one resolution level might not be the same as for another level. For example, the most intense color may be assigned to total aggregate data values of 20 or more at a finer zoom level, and that same color may be reserved for total aggregate data values of 500 or more at a coarser zoom level. The systems, methods, and other embodiments described herein enable automatic calculation of color bins as the user zooms in or out based on the automatic aggregation of optimum-resolution hexagons, as discussed above. Users may enable or disable automatic calculation of color bins for example, if they want to examine a set of specific thresholds) by toggling switch 925. If this automatic calculation of color bins feature is disabled, the user may specify threshold values at which hexagons transition between colors, for example by editing values in threshold values 930 shown in key 920.

Example Method

Figure 10:
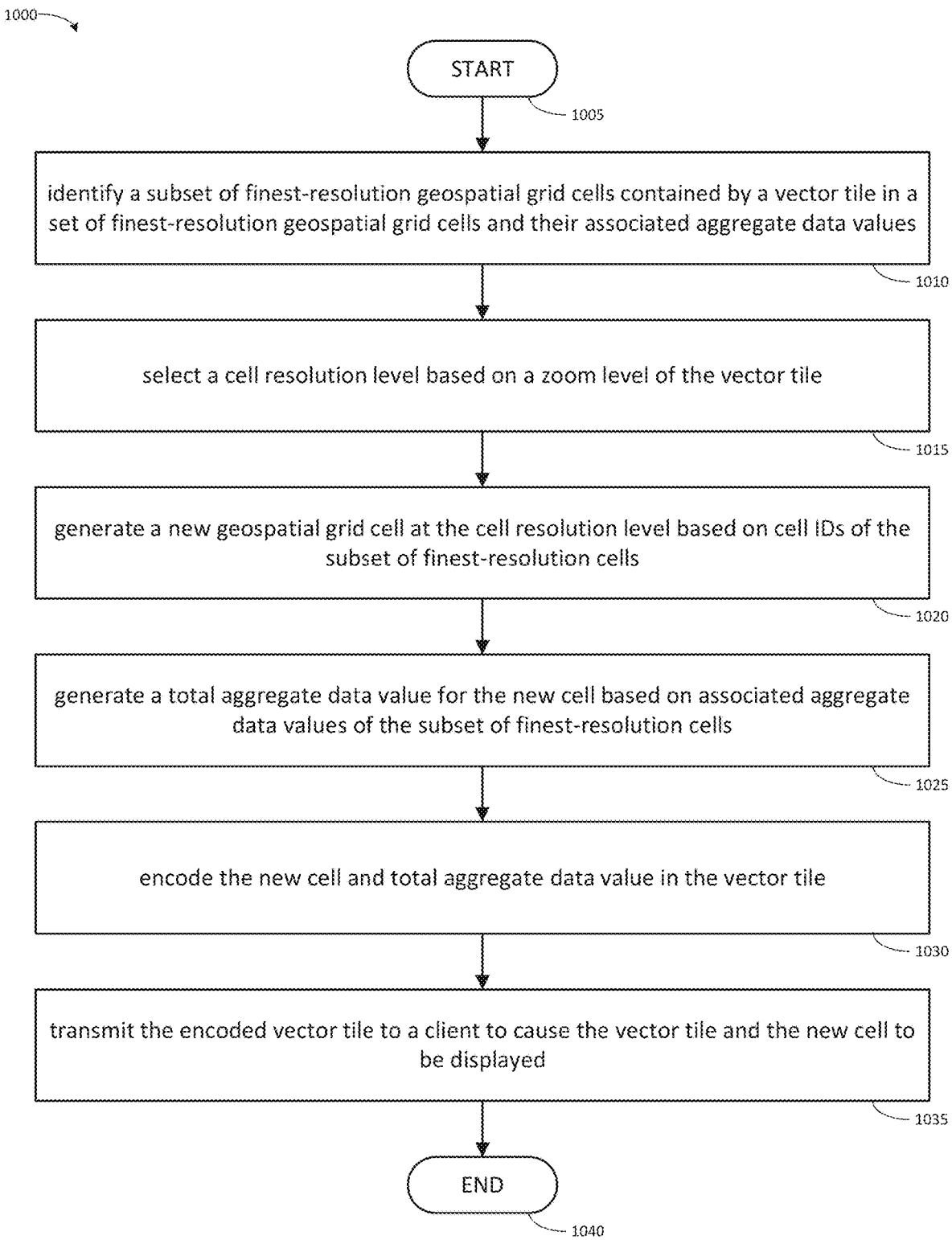
FIG. 10 illustrates one embodiment of a method 1000 associated with generation of aggregate data geospatial grid cells for encoding in vector tiles.

FIG. 10 illustrates one embodiment of a method 1000 associated with generation of aggregate data geospatial grid cells for encoding in vector tiles. In one embodiment, method 1000 is a cell vector tile generation method In one embodiment, the steps of method 1000 are performed by geospatial data aggregation and visualization components 320 (as shown and described with reference to FIG. 300). In one embodiment, geospatial data aggregation and visualization components 320 is a special purpose computing device (such as computing device 1105) configured with aggregate data geospatial grid cell generation and encoding logic 1130. In one embodiment, geospatial data aggregation and visualization components 320 is a module of a special purpose computing device configured with logic 1130. In one embodiment, real time, on-demand generation of grid cells at any cell resolution level with aggregated data values for all data points occurring within the geospatial boundary defined by the cell is enabled by the steps of method 1000, where such real time generation of cells was not previously possible to be performed by computing devices.

The method 1000 may be initiated automatically based on various triggers, such as in response to receiving a signal over a network or parsing stored data indicating that (i) a user (or administrator) of system 300 has initiated method 400, (ii) that method 400 is scheduled to be initiated at defined times or time intervals, (iii) that a point dataset and one or more aggregation criteria have been provided (for example by retrieval from storage), (iv) that a client system has requested performance of method 400, or (v) some other trigger occurs. The method 1000 initiates at START block 1005 in response to parsing a signal received or stored data retrieved and determining that the signal or stored data indicates that the method 1000 should begin. Processing continues to process block 1010.

At process block 1010, the processor identifies a subset of finest-resolution geospatial grid cells contained by a vector tile in a set of finest-resolution geospatial grid cells and their associated aggregate data values, for example as shown and described with reference to process block 440 of method 400 above. Processing then continues to process block 1015. At process block 1015, the processor selects a cell resolution level based on a zoom level of the vector tile, for example as shown and described with reference to process block 445 above. Processing then continues to process block 1020. At process block 1020, the processor generates a new geospatial grid cell at the cell resolution level based on cell IDs of the subset of finest-resolution cells, for example as shown and described with reference to process block 450 above. Processing then continues to process block 1025. At process block 1025, the processor generates a total aggregate data value for the new cell based on associated aggregate data values of the subset of finest-resolution cells, for example as shown and described with reference to process block 450 above. Processing then continues to process block 1030. At process block 1030, the processor encodes the new cell and total aggregate data value in the vector tile, for example as shown and described with reference to process block 450 above. Processing then continues to process block 1035. At process block 1035, the processor transmits the encoded vector tile to a client to cause the vector tile and the new cell to be displayed, for example as shown and described with reference to process block 455 above. Processing then continues to END block 1040, where process 1000 ends.

In one embodiment, the geospatial grid cells are hexagons of a hexagonal-grid geospatial indexing system, as shown and described in further detail herein. In one embodiment, the set of finest-resolution cell IDs and their associated aggregate data values is recorded in a table of a CLOB data structures (i) that group the finest-resolution cells by common ancestor at each hexagon resolution level and (ii) in which each finest resolution cell ID is immediately followed by its associated aggregate data value, as shown and described in further detail herein.

In one embodiment, a cell aggregation and packing method is performed as a preliminary configuration or setup method before performance of the steps of method 1000. In a first step, the processor aggregates the set of finest-resolution cells and associated aggregate data values from a point dataset, as shown and described in further detail herein. In a second step, the processor determines common ancestors of the finest-resolution cells at a coarser cell resolution level, as shown and described in further detail herein. In one embodiment, the processor determines common ancestors of the finest resolution cells at each coarser cell resolution level (for example levels 0-14 in an H3-based system), as shown and described in further detail herein. In a third step, the processor, for the common ancestors, stores a group of finest-resolution cells having a common ancestor in a data structure discrete from data structures storing cells having with other common ancestors, as shown and described in further detail herein. In one embodiment, the processor stores a separate data structure (such as a CLOB) of finest-resolution cells grouped by their common ancestor at each of the coarser resolution levels, as shown and described in further detail herein.

In one embodiment, the processor generates multiple cells at the cell resolution level to cover the vector tile. In a first step, the processor determines the length of a longest edge of the vector tile (relative to other edges of the vector tile) at the zoom level, as shown and described in further detail herein. In a second step, the processor determines the cell resolution level at which a predetermined number of cells may be placed along the longest edge in order to select the cell resolution level, as shown and described in further detail herein. In a third step, the processor generates additional new cells at the cell resolution level to cover area of the vector tile not covered by the new cell, as shown and described in further detail herein. In a fourth step, the processor generates additional total aggregate data values for the additional new cells, as shown and described in further detail herein. In a fifth step, the processor encodes the additional new cells and additional total aggregate data values in the vector tile, as shown and described in further detail herein. In this way, hexagons that aggregate data points within the geospatial boundary of the vector tile are encoded in the vector tile.

In one embodiment, following the transmission of the encoded vector tile to a client, a method for updating the hexagons following an input change to zoom level is performed. In a first step, the processor displays the vector tile and the new cell in a graphical user interface that displays the vector tile as part of a thematic map, as shown and described in further detail herein. In a second step, the processor accepts a user input changing the zoom level through the graphical user interface, as shown and described in further detail herein. In a third step, the processor automatically generates an updated cell at an updated cell resolution level selected based on the changed zoom level, as shown and described in further detail herein. In a fourth step, the processor encodes the updated cell in an updated vector tile, as shown and described in further detail herein. In a fifth step, the processor transmits the updated vector tile for display in the graphical user interface, as shown and described in further detail herein.

In one embodiment, the processor displays the new hexagon (on top of the vector tile) in a graphical user interface using a color associated with the total aggregate data value by a color code, as shown and described in further detail herein.

Selected Advantages

As one advantage, systems, methods, and other embodiments described herein for database-centric aggregation and visualization of data points using hexagons provide a drastic reduction in database usage for generating visualizations using hexagonal indexes, such as H3. This advantage is realized over other aggregation and visualization operations implemented using the same benchmark hardware configuration. This demonstrates that the systems, methods, and other embodiments described herein, improve the performance of a computing device in visualizing hexagonally-indexed datasets. The performance improvement is so great as to enable real-time, exploratory analysis of visualized hexagonally indexed data where such analysis was not previously possible, even with brute force addition of additional processing and memory resources. In another advantage, the systems, methods, and other embodiments described herein use one simple query for loading a substantially low amount of data from the database per dataset, as shown and described herein. In another advantage, the systems, methods, and other embodiments described herein have a very low in-memory requirement for caching hexagon datasets, as shown and described herein. In another advantage, the systems, methods, and other embodiments described herein perform dynamic (that is, performed at runtime on an as-needed basis) in-memory generation and automated aggregation of hexagons for all possible resolutions based on inputs of just the finest (highest) resolution hexagons. In another advantage, the systems, methods, and other embodiments described herein generates vector tiles with embedded or overlaid hexagon data visualization dynamically (at runtime) and in real-time or near real-time, with minimal advance data preparation. These and other improvements improve the technology of geospatial data visualization at least by increasing speed of visualization at runtime to real-time or near real-time without modification to computing hardware configuration.

In another advantage, the systems, methods, and other embodiments described herein enable the real-time hexagonal grid visualizations of aggregated location-specific data points in digital maps. Use of grid systems offer advantages in datapoint aggregation over irregular divisions such as postal code areas or political subdivisions (such as nation, state/province, city, borough, ward, etc.), which may have unusual shapes and sizes and may change over time. While individual grid cells may not align with streets and neighborhoods, or other divisions, a group of grid cells can collectively represent such geometries. Hexagonal cells, in particular, provide an advantage in visualization that a hexagon center-point is equidistant from all its neighbors, as compared to triangles or squares being used for a grid system. This property greatly simplifies performing analysis and smoothing over gradients.

Software Module Embodiments

Software instructions may be designed to be executed by one or more suitably programmed processor accessing memory, such as by accessing CPU or GPU resources. These software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by a main program for the system, an operating system (OS), or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

Cloud or Enterprise Embodiments

In one embodiment, the present system (such as system 300) includes a computing/data processing system including a computing application or collection of distributed computing applications (such as dynamic hexagon vector tile generation components 375) for access and use by other client computing devices associated with an enterprise (such as the client devices 345, 350, 355 and 360 of enterprise network 315). The system and client computing devices communicate with each other over a network (such as network 310). The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment, geospatial information system or service 305 may be implemented on on-premises infrastructure, such as a set of one or more dedicated servers. In one embodiment the present system provides at least one or more of the functions disclosed herein and a graphical user interface to access and operate the functions.

Computing Device Embodiment

Figure 11:
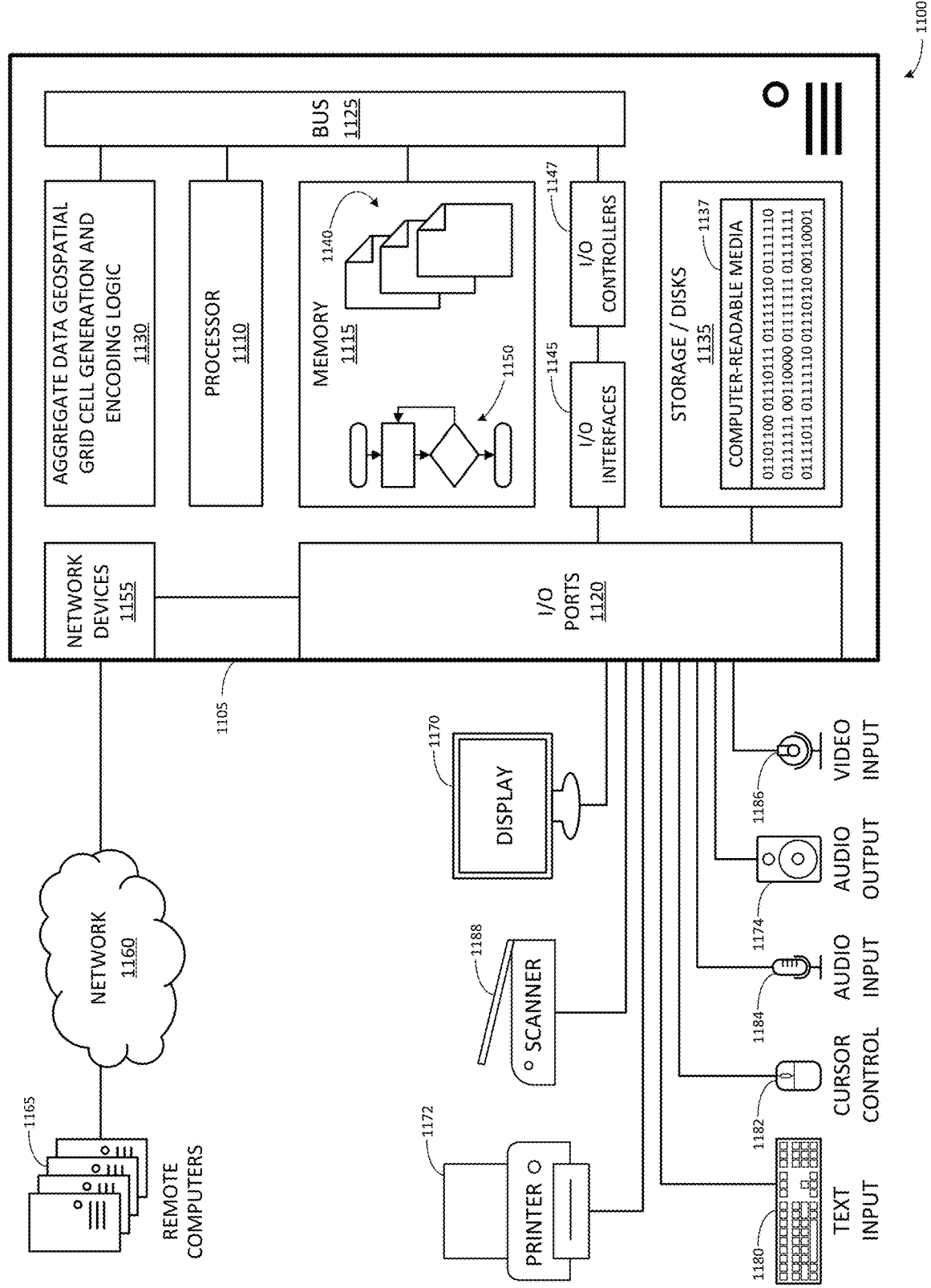
FIG. 11 illustrates an embodiment of a computing system configured with the example systems and/or methods disclosed.

FIG. 11 illustrates an example computing system 1100 that is configured and/or programmed as a special purpose computing device with one or more of the example systems and methods described herein, and/or equivalents. The example computing device may be a computer 1105 that includes a processor 1110, a memory 1115, and input/output ports 1120 operably connected by a bus 1125. In one example, the computer 1105 may include aggregate data geospatial grid cell generation and encoding logic 1130 configured to facilitate database-centric aggregation and visualization of large volume data points using hexagons similar to the logic, systems, and methods shown and described with reference to FIGS. 2-10. In different examples, aggregate data geospatial grid cell generation and encoding logic 1130 may be implemented in hardware, a non-transitory computer-readable medium with stored instructions, firmware, and/or combinations thereof. While aggregate data geospatial grid cell generation and encoding logic 1130 is illustrated as a hardware component attached to the bus 1125, it is to be appreciated that in other embodiments, aggregate data geospatial grid cell generation and encoding logic 1130 could be implemented in the processor 1110, stored in memory 1115, or stored in disk 1135 on computer-readable media 1137.

In one embodiment, aggregate data geospatial grid cell generation and encoding logic 1130 or the computing system 1100 is a means (such as, structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform database-centric aggregation and visualization of large volume data points using hexagons. The means may also be implemented as stored computer executable instructions that are presented to computer 1105 as data 1140 that are temporarily stored in memory 1115 and then executed by processor 1110.

Aggregate data geospatial grid cell generation and encoding logic 1130 may also provide means (e.g., hardware, non-transitory computer-readable medium that stores executable instructions, firmware) for performing database-centric aggregation and visualization of large volume data points using hexagons.

Generally describing an example configuration of the computer 1105, the processor 1110 may be a variety of various processors including dual microprocessor and other multi-processor architectures. A memory 1115 may include volatile memory and/or non-volatile memory. Non-volatile memory may include, for example, ROM, PROM, EPROM, EEPROM, and so on. Volatile memory may include, for example, RAM, SRAM, DRAM, and so on.

A storage disk 1135 may be operably connected to the computer 1105 by way of, for example, an input/output (I/O) interface (for example, a card or device) 1145 and an input/output port 1120 that are controlled by at least an input/output (I/O) controller 1147. The disk 1135 may be, for example, a magnetic disk drive, a solid-state disk drive, a floppy disk drive, a tape drive, a Zip drive, a flash memory card, a memory stick, and so on. Furthermore, the disk 1135 may be a CD-ROM drive, a CD-R drive, a CD-RW drive, a DVD ROM, and so on. The memory 1115 can store a process 1150 and/or data 1140 formatted as one or more data structures, for example. The disk 1135 and/or the memory 1115 can store an operating system that controls and allocates resources of the computer 1105.

The computer 1105 may interact with, control, and/or be controlled by input/output (I/O) devices via the input/output (I/O) controller 1147, the I/O interfaces 1145 and the input/output ports 1120. The input/output devices include one or more displays 1170, printers 1172 (such as inkjet, laser, or 3D printers), and audio output devices 1174 (such as speakers or headphones), text input devices 1180 (such as keyboards), a pointing and selection device 1182 (such as mice, trackballs, touchpads, touch screens, joysticks, pointing sticks, stylus mice), audio input devices 1184 (such as microphones), video input devices 1186 (such as video and still cameras), video cards (not shown), disk 1135, network devices 1155, and so on. The input/output ports 1120 may include, for example, serial ports, parallel ports, and USB ports.

The computer 1105 can operate in a network environment and thus may be connected to the network devices 1155 via the I/O interfaces 1145, and/or the I/O ports 1120. Through the network devices 1155, the computer 1105 may interact with a network 1160. Through the network 1160, the computer 1105 may be logically connected to remote computers 1165. Networks with which the computer 1105 may interact include, but are not limited to, a LAN, a WAN, a cloud, and other networks.

Data Operations

Data can be stored in memory by a write operation, which stores a data value in memory at a memory address. The write operation is generally: (1) use the processor to put a destination address into a memory address register; (2) use the processor to put a data value to be stored at the destination address into a memory data register; and (3) use the processor to copy the data from the memory data register to the memory cell indicated by the memory address register. Stored data can be retrieved from memory by a read operation, which retrieves the data value stored at the memory address. The read operation is generally: (1) use the processor to put a source address into the memory address register; and (2) use the processor to copy the data value currently stored at the source address into the memory data register. In practice, these operations are functions offered by separate software modules, for example as functions of an operating system. The specific operation of processor and memory for the read and write operations, and the appropriate commands for such operation will be understood and may be implemented by the skilled artisan.

Generally, in some embodiments, references to storage or storing indicate storage as a data structure in memory or storage/disks of a computing device (such as memory 1115, or storage/disks 1135 of computing device 1105 or remote computers 1165).

Further, in some embodiments, a database associated with the method may be included in memory or storage. In a database, the storage and retrieval functions indicated may include the self-explanatory 'create,' 'read,' 'update,' or 'delete' data (CRUD) operations used in operating a database. These operations may be initiated by a query composed in the appropriate query language for the database. The specific form of these queries may differ based on the particular form of the database, and based on the query language for the database. For each interaction with a database described herein, the processor composes a query of the indicated database to perform the unique action described. Where the query includes a 'read' operation, the data returned by executing the query on the database may be stored as a data structure in a data store, such as data store 330, or in memory.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

Acronyms and initialisms used herein have the following meanings:
API: application programming interface;
ASIC: application-specific integrated circuit;
CD: compact disk;
CD-R: CD recordable;
CD-RW: CD rewriteable;
CPU: central processing unit;
CRUD: create, read, update, delete;
DRAM: dynamic RAM;
DVD: digital versatile disk and/or digital video disk;
GPU: graphics processing unit;
GUI: graphical user interface;
HDD: hard disk drive;
HPC: high-performance computing;
HTTP: hypertext transfer protocol;
HTTPS: hypertext transfer protocol secure;
I/O: input/output;
IAAS: infrastructure-as-a-service;
JSON: JavaScript object notation;
LAN: local area network;
NAS: network-attached storage;
OS: operating system;
PAAS: platform-as-a-service;
PROM: programmable ROM;
RAM: random access memory;
REST: representational state transfer;
ROM: read only memory;
SAAS: software-as-a-service;
SOAP: simple object access protocol
SQL: structured query language;
SRAM: synchronous RAM;
SSD: solid-state storage device;
TCP/IP: Transmission Control Protocol/Internet Protocol
USB: universal serial bus;
WAN: wide area network; and
XML: extensible markup language.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer-readable medium that includes stored thereon computer-executable instructions that when executed by at least a processor of a computer cause the processor to:
   identify a subset of finest-resolution hexagons contained by a vector tile in a set of finest-resolution hexagons and their associated aggregate data values, wherein the vector tile includes a longest edge;
   select a hexagon resolution level based on a zoom level of the vector tile by (i) determining a length of the longest edge of the vector tile at the zoom level by comparison among edges of the vector tile, and (ii) determining at which hexagon resolution level a predetermined number of hexagons may be placed along the longest edge in order to select the hexagon resolution level, wherein the hexagon resolution level is determined by comparing the determined length of the longest edge to a multiple of the predetermined number by a unit length of hexagons at the hexagon resolution level;
   generate a new hexagon at the selected hexagon resolution level based on hexagon IDs of the subset of finest-resolution hexagons;
   generate a total aggregate data value for the new hexagon based on associated aggregate data values of the subset of finest-resolution hexagons;
   encode the new hexagon and total aggregate data value in the vector tile; and
   transmit the encoded vector tile to a client to cause the vector tile and the new hexagon to be displayed among a plurality of vector tiles.

2. The non-transitory computer-readable medium of claim 1, further comprising instructions that when executed by at least the processor cause the processor to:
   aggregate the set of finest-resolution hexagons and associated aggregate data values from a point dataset;
   determine common ancestors of the finest-resolution hexagons at a coarser hexagon resolution level; and
   for the common ancestors, store a group of finest-resolution hexagons having a common ancestor in a data structure discrete from data structures storing hexagons having other common ancestors.

3. The non-transitory computer-readable medium of claim 1, further comprising instructions that when executed by at least the processor cause the processor to:
   determine common ancestors of the finest resolution hexagons at each coarser hexagon resolution level; and
   store a separate data structure of finest-resolution hexagons grouped by their common ancestor at each of the coarser resolution levels.

4. The non-transitory computer-readable medium of claim 1, further comprising instructions that when executed by at least the processor cause the processor to:
   generate additional new hexagons at the selected hexagon resolution level to cover area of the vector tile not covered by the new hexagon;
   generate additional total aggregate data values for the additional new hexagons; and
   encode the additional new hexagons and additional total aggregate data values in the vector tile.

5. The non-transitory computer-readable medium of claim 1, further comprising instructions that when executed by at least the processor cause the processor to:
   display the vector tile and the new hexagon in a graphical user interface that displays the vector tile as part of a thematic map;
   accept a user input changing the zoom level through the graphical user interface;
   automatically generate an updated hexagon at an updated hexagon resolution level selected based on the changed zoom level;
   encode the updated hexagon in an updated vector tile; and
   transmit the updated vector tile for display in the graphical user interface.

6. The non-transitory computer-readable medium of claim 1, wherein the set of finest-resolution hexagon IDs and their associated aggregate data values is recorded in a table of CLOB data structures (i) that group the finest-resolution hexagons by common ancestor at each hexagon resolution level and (ii) in which each finest resolution hexagon ID is immediately followed by its associated aggregate data value.

7. The non-transitory computer-readable medium of claim 1, further comprising instructions that when executed by at least the processor cause the processor to display the new hexagon in a graphical user interface using a color associated with the total aggregate data value by a color code.

8. A computing system, comprising:
   a processor;
   a memory operably connected to the processor;
   a non-transitory computer-readable medium operably connected to the processor and memory and storing computer-executable instructions that when executed by at least a processor of the computing system cause the computing system to:

identify a subset of finest-resolution hexagons contained by a vector tile in a set of finest-resolution hexagons and their associated aggregate data values, wherein the vector tile includes a longest edge;

select a hexagon resolution level based on a zoom level of the vector tile by (i) determining a length of the longest edge of the vector tile at the zoom level by comparison among edges of the vector tile, and (ii) determining at which hexagon resolution level a predetermined number of hexagons may be placed along the longest edge in order to select the hexagon resolution level, wherein the hexagon resolution level is determined by comparing the determined length of the longest edge to a multiple of the predetermined number by unit length of hexagons at the hexagon resolution level;

generate a new hexagon at the selected hexagon resolution level based on hexagon IDs of the subset of finest-resolution hexagons;

generate a total aggregate data value for the new hexagon based on associated aggregate data values of the subset of finest-resolution hexagons;

encode the new hexagon and total aggregate data value in the vector tile; and transmit the encoded vector tile to a client to cause the vector tile and the new hexagon to be displayed among a plurality of vector tiles.

9. The computing system of claim 8 wherein the instructions that when executed by at least the processor further cause the computing system to:

aggregate the set of finest-resolution hexagons and associated aggregate data values from a point dataset;

determine common ancestors of the finest-resolution hexagons at a coarser hexagon resolution level; and for the common ancestors, store a group of finest-resolution hexagons having a common ancestor in a data structure discrete from data structures storing hexagons having with other common ancestors.

10. The computing system of claim 8 wherein the instructions that when executed by at least the processor further cause the computing system to:

determine common ancestors of the finest resolution hexagons at each coarser hexagon resolution level; and store a separate data structure of finest-resolution hexagons grouped by their common ancestor at each of the coarser resolution levels.

11. The computing system of claim 8 wherein the instructions that when executed by at least the processor further cause the computing system to:

generate additional new hexagons at the selected hexagon resolution level to cover area of the vector tile not covered by the new hexagon;

generate additional total aggregate data values for the additional new hexagons; and encode the additional new hexagons and additional total aggregate data values in the vector tile.

12. The computing system of claim 8 wherein the instructions that when executed by at least the processor further cause the computing system to:

display the vector tile and the new hexagon in the graphical user interface that displays the vector tile as part of a thematic map;

accept a user input changing the zoom level through the graphical user interface;

automatically generate an updated hexagon at an updated hexagon resolution level selected based on the changed zoom level;

encode the updated hexagon in an updated vector tile; and transmit the updated vector tile for display in the graphical user interface.

13. The computing system of claim 8, wherein the set of finest-resolution hexagon IDs and their associated aggregate data values is recorded in a table of CLOB data structures (i) that group the finest-resolution hexagons by common ancestor at each hexagon resolution level and (ii) in which each finest resolution hexagon ID is immediately followed by its associated aggregate data value.

14. A computer-implemented method, comprising:

identifying a subset of finest-resolution geospatial grid cells contained by a vector tile in a set of finest-resolution geospatial grid cells and their associated aggregate data values, wherein the vector tile includes a longest edge;

selecting a cell resolution level based on a zoom level of the vector tile by (i) determining a length of the longest edge of the vector tile at the zoom level by comparison among edges of the vector tile, and (ii) determining at which cell resolution level a predetermined number of cells may be placed along the longest edge in order to select the cell resolution level, wherein the cell resolution level is determined by comparing the determined length of the longest edge to a multiple of the predetermined number by unit lengths of cells at the cell resolution level;

generating a new geospatial grid cell at the selected cell resolution level based on cell IDs of the subset of finest-resolution cells;

generating a total aggregate data value for the new cell based on associated aggregate data values of the subset of finest-resolution cells;

encoding the new cell and total aggregate data value in the vector tile; and transmitting the encoded vector tile to a client to cause the vector tile and the new cell to be displayed among a plurality of vector tiles.

15. The computer-implemented method of claim 14, further comprising:

aggregating the set of finest-resolution cells and associated aggregate data values from a point dataset;

determining common ancestors of the finest-resolution cells at a coarser cell resolution level; and for the common ancestors, storing a group of finest-resolution cells having a common ancestor in a data structure discrete from data structures storing cells having with other common ancestors.

16. The computer-implemented method of claim 14, further comprising:

determining common ancestors of the finest resolution cells at each coarser cell resolution level; and storing a separate data structure of finest-resolution cells grouped by their common ancestor at each of the coarser resolution levels.

17. The computer-implemented method of claim 14, further comprising:

generating additional new cells at the selected cell resolution level to cover area of the vector tile not covered by the new cell;

generating additional total aggregate data values for the additional new cells; and encoding the additional new cells and additional total aggregate data values in the vector tile.

18. The computer-implemented method of claim 14, further comprising:
- displaying the vector tile and the new cell in a graphical user interface that displays the vector tile as part of a thematic map;
- accepting a user input changing the zoom level through the graphical user interface;
- automatically generating an updated cell at an updated cell resolution level selected based on the changed zoom level;
- encoding the updated cell in an updated vector tile; and
- transmitting the updated vector tile for display in the graphical user interface.

19. The computer-implemented method of claim 14, wherein the set of finest-resolution cell IDs and their associated aggregate data values is recorded in a table of CLOB data structures (i) that group the finest-resolution cells by common ancestor at each cell resolution level and (ii) in which each finest resolution cell ID is immediately followed by its associated aggregate data value.

20. The computer-implemented method of claim 14, wherein the geospatial grid cells are hexagons of a hexagonal-grid geospatial indexing system.

* * * * *

UNITED STATES PATENT AND TRADEMARK OFFICE
CERTIFICATE OF CORRECTION

| | | |
|---|---|---|
| PATENT NO. | : 12,061,784 B2 | Page 1 of 1 |
| APPLICATION NO. | : 17/691594 | |
| DATED | : August 13, 2024 | |
| INVENTOR(S) | : Malhotra et al. | |

It is certified that error appears in the above-identified patent and that said Letters Patent is hereby corrected as shown below:

In the Specification

In Column 2, Line 51, delete "cells" and insert -- cells. --, therefor.

In Column 11, Lines 27-28, delete "of the of the" and insert -- of the --, therefor.

In Column 16, Line 36, after "resolution" insert -- 15 --, therefor.

In Column 18, Line 66, delete "method" and insert -- method. --, therefor.

In Column 19, Line 2, delete "FIG. 300" and insert -- FIG. 3 --, therefor.

Signed and Sealed this
Tenth Day of December, 2024

*Katherine Kelly Vidal*

Katherine Kelly Vidal
*Director of the United States Patent and Trademark Office*